US012617098B2

(12) United States Patent
Krajicek et al.

(10) Patent No.: US 12,617,098 B2
(45) Date of Patent: May 5, 2026

(54) METHOD, APPARATUS, AND SYSTEM FOR AUTOMATING OPERATION OF A MACHINE

(71) Applicant: Y Soft Corporation, A.S., Brno (CZ)

(72) Inventors: Ondrej Krajicek, Brno (CZ); Aleš Pernikář, Brno (CZ); Václav Notvotný, Brno (CZ); Jiří Kyzlink, Brno (CZ); Jakub Pavlák, Brno (CZ); Barbora Koudarová, Brno (CZ); Oto Dušek, Brno (CZ); Lukáš Valek, Brno (CZ)

(73) Assignee: Y SOFT CORPORATION, A.S., Brno (CZ)

( * ) Notice: Subject to any disclaimer, the term of this patent is extended or adjusted under 35 U.S.C. 154(b) by 0 days.

(21) Appl. No.: 18/085,702

(22) Filed: Dec. 21, 2022

(65) Prior Publication Data

US 2023/0191616 A1 Jun. 22, 2023

Related U.S. Application Data

(60) Provisional application No. 63/292,316, filed on Dec. 21, 2021.

(51) Int. Cl.
*B25J 9/16* (2006.01)
*B25J 19/02* (2006.01)

(52) U.S. Cl.
CPC ........... *B25J 9/1697* (2013.01); *B25J 19/023* (2013.01)

(58) Field of Classification Search
CPC ........ B25J 9/162; B25J 9/1697; B25J 19/021; G05D 1/0246; G05D 1/0044; G05D 1/0016; G05D 1/0219
See application file for complete search history.

(56) References Cited

U.S. PATENT DOCUMENTS 6,425,865 B1 * 7/2002 Salcudean .............. A61B 34/32
600/437
11,069,082 B1 * 7/2021 Ebrahimi Afrouzi .. H04N 23/56
(Continued)

FOREIGN PATENT DOCUMENTS

JP 2009-098440 5/2009
JP 2011-154656 8/2011
(Continued)

OTHER PUBLICATIONS

Wang, F., et al., "Robot Button Pressing in Human Environments", 2018 IEEE International Conference on Robotics and Automation (ICRA), IEEE, May 21, 2018, pp. 7173-7180 (2018).
(Continued)

*Primary Examiner* — Dalena Tran
(74) *Attorney, Agent, or Firm* — McDermott Will & Schulte LLP

(57) ABSTRACT

A robotic system for operating a machine includes an arm, an actuator coupled to the arm and configured to indicate a change in an interactive medium of the machine when the actuator physically interfaces with the interactive medium, a visual source configured to provide an image of the machine in a field of view; and a processor coupled to the arm and the visual source. Images obtained from the field of view can be used to extract information about the machine and that information can be used to operate the arm to actuate the interactive medium of machine and perform the physical task using the machine.

21 Claims, 21 Drawing Sheets

(56)     References Cited

U.S. PATENT DOCUMENTS

| | | | |
|---|---|---|---|
| 2005/0028133 A1 | 2/2005 | Ananth et al. | |
| 2006/0095893 A1 | 5/2006 | Vahid et al. | |
| 2010/0011340 A1 | 1/2010 | Pandey | |
| 2013/0127904 A1 | 5/2013 | Dove et al. | |
| 2013/0227348 A1 | 8/2013 | Stephenson et al. | |
| 2014/0006860 A1 | 1/2014 | Grey | |
| 2015/0057961 A1 | 2/2015 | Montoya et al. | |
| 2016/0070550 A1 | 3/2016 | Van Eijndhoven et al. | |
| 2018/0113774 A1* | 4/2018 | Kyzlink | G01R 31/2834 |
| 2019/0033888 A1 | 1/2019 | Bosworth et al. | |
| 2019/0321981 A1 | 10/2019 | Bosworth et al. | |
| 2022/0100917 A1* | 3/2022 | McGregor | G06T 13/20 |
| 2022/0234078 A1* | 7/2022 | Bartrom | B07C 5/342 |
| 2023/0161336 A1* | 5/2023 | Brooks | G05B 19/4183 |
| | | | 700/97 |

FOREIGN PATENT DOCUMENTS

| | | |
|---|---|---|
| JP | 2016-014558 | 1/2016 |
| JP | 7549697 | 9/2024 |

OTHER PUBLICATIONS

International Preliminary Report on Patentability for International Patent Application No. PCT/IB2022/000773, mailed Jul. 4, 2024 (14 pages).

* cited by examiner

100

110
120 ↔ 130

148

160

162    163

101

173
170
170A
170J  170B
174
172

176
175

199
152
152'
150

METHOD, APPARATUS, AND SYSTEM FOR AUTOMATING OPERATION OF A MACHINE

RELATED APPLICATIONS

This application claims the benefit of and priority to U.S. Provisional Application No. 63/292,316, filed on Dec. 21, 2021, the entire teachings of which are incorporated herein by reference.

FIELD

This application generally relates to methods, system, and apparatus for automating the operation of a machine, and more specifically automating the operation of a machine using a robotic system.

BACKGROUND

Automation of the operation of a machine that is normally manually operated can be a difficult and complex process as it requires use of automation systems to interact with interfaces designed for use by a human operator.

SUMMARY

Figure 1A:
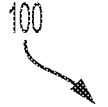
FIG. 1A is a block diagram of a robotic system, according to some embodiments disclosed herein.

A robotic system for operating a machine having an interface with an interactive medium for use in performing a physical task using the machine can include an arm, an actuator coupled to the arm for indicating a change in the interactive medium when the actuator interfaces with the interactive medium, a visual source for providing an image of the machine in a field of view, a processor coupled to the arm and the visual source, and a memory coupled to the processor and configured to store computer executable programs. The computer executable programs can include instructions, that upon execution by the processor, extract, from the image, information indicating a metric for identifying the interface within the field of view, extract information indicating a characteristic of the interactive medium based on signals from the actuator indicating the change in the interactive medium, and operate the arm to actuate the interactive medium to perform the physical task using the machine.

The arm can be a robotic arm having a proximal and a distal end.

The actuator can be coupled to the arm. For example, the actuator can be coupled to the distal end of the arm. The actuator can include a pressure sensor coupled to its distal end that indicates the change by sensing a change in resistance when the distal end of the actuator interfaces with the interactive medium. Although described in connection with a pressure sensor, any suitable sensor available in the art can be used with the embodiments disclosed herein (e.g., an optical sensor). The pressure sensor and/or the optical sensor can be a digital sensor. Further, the pressure sensor can include a piezoresistive sensor.

The processor can extract information indicating the characteristic of the interactive medium based on signals from the pressure sensor indicating the change in the resistance indicated by the pressure sensor.

The visual source can include a camera, such as an infrared camera. For example, the camera can be coupled to the arm. The camera can be configured to rotate around the machine to obtain images of the machine. Further, the visual source can include a source storing visual information on the field of view. Generally, any visual source available in the art can be used. For example, the visual source can include at least one of an ultrasound camera, an ultrasound sensor, and LIDAR.

Further, the visual source can be coupled to the robotic system via a communications network. For example, the visual source can be configured to provide a video stream of the field of view. Alternatively or additionally, the visual source can include pre-captured images.

Further, the arm can be configured to move in two dimensions in the field of view in a vicinity of the machine. Alternatively or additionally, the arm can be configured to move in three dimensions in the field of view in the vicinity of the machine. The field of view can be a three-dimensional field of view.

The actuator can be configured to move in a dimension additional to dimensions in which the arm can be configured to move. The arm can include one or more segments connected at one or more joints, where each segment can be configured to translate relative to adjacent segment relative to its respective joints. The arm can further include one or more segments connected at one or more joints, where each segment can be configured to rotate relative to adjacent segment relative to its respective joints. Further, the arm can be configured to rotate in the field of view in the vicinity of the machine.

The robotic system can include one or more additional cameras configured to obtain two or more images of the machine from two or more field of views. The two or more images can be configured to form a stream of images. The stream of images can provide a three-dimensional image of the machine.

The memory can be configured to store information for determining the metric for identifying the interface. The information can include predetermined data regarding a dimension of the machine within the field of view. The information can include predetermined data regarding a dimension of the interface within the field of view. The metric can include a dimension of the machine within the field of view. For example, the metric can include location of the machine within the field of view. Further, the metric can include orientation of the machine within the field of view. Alternatively or additionally, the metric can include location of the interface within the field of view. Further, the metric can include a boundary of the interface within the field of view.

The processor can further identify a dimension of the interactive medium. The characteristic can include a dimension of the interactive medium. For example, the characteristic can include a color of the interactive medium. Alternatively or additionally, the characteristic can include a texture of the interactive medium. Further, the characteristic can include a visual characteristic of the interactive medium. Furthermore, the characteristic can include text appearing on the interactive medium.

The system can store the metric in the memory. For example, the system can store the characteristic in the memory.

Further, the processor can be connected to a communications network and configured to receive instructions from a remote entity via the communications network.

The system can adjust the camera to obtain an additional image in an additional field of view. Further, the system can extract the information including the metric for identifying the interface within the field of view, analyze the extracted information to determine whether additional information for identifying the interface is needed, and in an event the additional information is needed, adjust the camera to obtain the additional image within the additional field of view. The adjustment of the camera can include adjusting an angle of the camera.

The robotic system can further include instructions that, upon execution, can adjust an intensity of the light emitted by the light emitter prior to obtaining the additional images. The system can extract the information including the metric for identifying the interface within the field of view, analyze the extracted information to determine whether additional information for identifying the interface is needed and in an event the additional information is needed, obtain the additional images at a different time. Further, the system can analyze obtained images and score each image based on amount of information available in the image for identifying the interface or the interactive medium within the field of view. Furthermore, the system can score each image based on a probability of accurate detection of the characteristic of the interactive medium. The system can also exclude images having a score lower than a predetermined score from being used for identifying the interface or the interactive medium within the field of view. Further, the system can employ images having a score higher than a predetermined score for identifying the interface or the interactive medium within the field of view.

The memory can be configured to store previously validated data on at least one of the metric for identifying the interface or the interactive medium. The previously validated data can include data provided by a human operator of the machine. Additionally or alternatively, the previously validated data can include data provided from the remote entity via the communications network. The previously validated data can include data obtained from at least one of an original manual for the machine and an online resource. The system can analyze the at least one of the original manual or the online resource to extract information for identifying the interface or the interactive medium.

The previously validated data can include a glyph dictionary. The glyph dictionary can include a collection of images. The system can be configured to update the glyph dictionary using the metric for identifying the interface and the characteristic of the interactive medium obtained from the image and the pressure sensor. The instructions can be configured to update the glyph dictionary using images having a score higher than the predetermined score. The instructions can score each image by comparing the image to the previously validated data.

The memory can be configured to store a list of the physical tasks for performing using the interactive medium. The memory can be configured to store a ranking for each physical task from the list of the physical tasks. The arm can be directed by the processor to perform the physical tasks based on the rank assigned to each task. A physical task having a higher ranking can be performed before a physical task with a lower ranking. The physical task having highest ranking can be a preferred task for performing using the machine. The robotic system can further include an actuating arm connected to the distal end of the arm to perform the physical task via the interactive medium.

The memory can be configured to store a library of physical tasks for performing using the machine and through interaction with the interactive medium. The processor can select the physical task for execution from the library of physical tasks. The instructions executed by the processor can further include defining the list of the physical tasks based on data obtained from a human operator who has previously operated the machine. The instructions executed by the processor can further include defining the list of the physical tasks based on data obtained from at least one of an original manual for the machine and an online resource.

The processor can be configured to execute the instructions in response to a voice command. The physical task can include at least one of lifting a weighted object, opening a door, dropping the weighted object, pushing the weighted object, and sliding the weighted object. The actuator can be configured to record a physical task performed by the machine in response to interaction with the interactive medium. The actuator can be configured to perform every action available through interaction with the interactive medium and record physical tasks performed in response to the action. The physical tasks can be recorded in a database. The database can be a glyph dictionary.

The robotic system can include a user interface connected to the processor for use in controlling the robotic system. The user interface can include a graphical interface for initiating execution of the computer executable programs. The processor can be configured to extract the information indicating the metric for identifying the interface within the field of view using an image processing scheme.

The processor can be configured to extract the information indicating the metric for identifying the interface within the field of view using an image processing scheme that receives previously validated images of the interface with the field of view and can employ a deep learning framework to identify the interface. The deep learning framework can include supervised deep learning. Alternatively or additionally, the deep learning framework can include unsupervised deep learning. The deep learning framework can include reinforced deep learning. The robotic system can further include scoring an image from the visual source based on an amount of information available in the image for identification of the machine or the interactive interface and can use images having a score higher than a predetermined value in the deep learning framework.

The robotic system can further include one or more sensors configured to measure a property of at least one of: the machine, the interactive element, and the field of view. The robotic system can further include an optical sensor configured to measure light intensity within the field of view and use the light intensity obtained from the light sensor to extract the metric for identifying the interface. The robotic system can further include an optical sensor configured to measure light intensity within the field of view and the system can adjust the image based on the light intensity.

The robotic system can further include a sensor configured to measure a feature of an area surrounding the machine, and adjust the extracted information based on the measured feature. The measured feature can be at least one of glare, audible noise, humidity, and haptic.

The instructions, upon execution, can compare the light intensity to a predetermined threshold and cause the visual source to obtain an additional image of the field of view in an event the light intensity is less than the predetermined threshold. The additional image can be obtained at a different time. The robotic system can further include a light emitter coupled with the light sensor, where the light sensor can measure the light intensity reflected in the field of view in response to light emitted from the light emitter. The light emitter can be configured to emit light in response to the light intensity being less than the predetermined threshold.

A robotic system for operating a machine having an interface with an interactive medium for operating a machine having an interactive medium for use in performing a physical task using the machine can include an arm configured to move in a first dimension, an actuator coupled to the arm and configured to move in a second dimension, a visual source configured to obtain an image of the machine, a processor coupled to the arm and the actuator, and a memory coupled to the processor and configured to store computer executable programs. The executable programs can include instructions that upon execution by the processor can extract from the image, information indicating a metric for identifying the interface within the field of view and based on the metric, move the arm in the first dimension in a vicinity of the interface, move the actuator in the second dimension in the vicinity of the interface, record an observed change by the actuator in the second dimension, extract information indicating a characteristic of the interactive medium based on the observed change, and operate the interactive element to actuate the interactive medium to perform the physical task using the machine.

DETAILED DESCRIPTION

The present disclosure relates to methods, system, and apparatus for operating a machine using a robotic system. The disclosed methods, system, and apparatus can be used to perform and automate various functions and tasks using a machine. For example, the disclosed methods, system, and apparatus can be used to configure an arm (e.g., robotic arm) to perform tasks and functions that are usually performed by a human operator through direct physical interaction with the machine.

FIG. 1A is a high-level block diagram of a robotic system 100 according to aspects disclosed herein. The robotic system 100 can be used to perform a physical task using a machine 150. The physical task can generally be any task that can be performed by a human operator via interaction (e.g., physical interaction) with the machine 150 (e.g., pressing a button). The machine 150 can also generally be any suitable machine available in the art. For example, the machine 150 can be a vending machine, a copier machine, a keyboard, a tablet, a phone, a kiosk, a manufacturing machine, a healthcare device, a 3d printer, etc.

The machine 150 can comprise an interactive medium 152 through which the machine 150 is operated. For example, the machine 150 can comprise a keypad or an LCD screen through which the operations of the machine 150 are conducted.

The interactive medium 152 can generally be any suitable interactive medium known/available in the art. For example, the interactive medium 152 can be a keypad with manual pushbuttons, a light switch, a button, a Liquid Crystal Display (LCD), etc. The interactive medium 152 can be a smart and/or touch sensitive interactive medium, such as an interactive medium with touch-sensitive elements (e.g., touch-screen interface with a digital button). Additionally or alternatively, the interactive medium 152 can include a manual interface with buttons that are manually actuated (e.g., buttons with physical feedback, wheels, and hold switches).

The robotic system 100 can further include an arm 170 for carrying out the operation of the system 100. The arm 170 can generally be any suitable mechanical element that can carry out the functions disclosed herein. For example, the arm 170 can be a robotic arm and/or a bracket. Further, the arm 170 can be secured, fixed, and/or coupled to the system 100 using any suitable techniques known in the art. For example, the arm 170 can be secured/fixed to a frame 172 and coupled to the system via the frame 172.

In some implementations, the arm 170 can comprise a proximal end 173, attached to the frame 172, and a distal end 175 that is configured to physically interface with the machine 150 (e.g., via the interactive medium 152). The arm 170 can also be configured to move in more than one dimension to physically interface with the machine 150 and the interactive medium 152.

The arm 170 can be movable and/or rotatable along one or more directions/dimensions. Specifically, the arm 170 can be configured such that it can move/translate along one or more directions and rotate along one or more dimensions. Further, the arm can include one or more segments 170A, 170B that are configured to move (for example about a joint 170J) in one or more directions and/or rotate (about the joint 170J) along one or more dimensions. The movement and/or rotation of the various segments 170A, 170B of the arm 170 can provide the arm 170 with the ability to translate and/or rotate across various dimensions (three, four, five, six, etc. dimensions).

The robotic system 100 can further include an actuator 176 that is configured to interface with the interactive medium 152. The actuator 176 can generally be any element capable of interacting with the interactive medium 152. For example, the actuator 176 can comprise a projection, a sensor (e.g., pressure sensor), etc. In some implementations, the actuator 176 can be coupled to a distal end 175 of an arm (e.g., robotic arm) and configured to carry out the functions of the robotic system (e.g., operating the machine). Alternatively or additionally, the actuator 176 can be a projection that extends from a portion of the arm 170 and can interact with the interactive medium 150.

The actuator 176 can be configured to translate/move and/or rotate about at least one additional direction and/or dimension than the direction(s) and dimension(s) through which the arm 170 can translate/rotate. This additional direction/dimension of movement can provide the arm 170 and actuator 176 with movement/rotation along in added dimensions/directions. For example, the arm 170 can be configured to move in five dimensions (e.g., X, Y, Z, 45 degrees to left along the Z-direction and 25 degrees to right along the X-direction) and the actuator 176 can be configured to rotate about its coupling to the arm 170, thereby providing at least one additional direction of movement/rotation to the system 100.

The actuator 176 can be configured to detect a change in the interactive medium 152 upon interfacing with the interactive medium 152. For example, the actuator 176 can come in physical contact with the interactive medium and/or interact with the interactive medium through any suitable means available in the art (e.g., by directing a light beam, such as laser, at the interactive medium. The actuator 176 can be configured to detect a change in the placement of a button 199 in the interactive medium 152. For example, in implementations in which the interactive medium 152 comprises a physical push button 199, the actuator 176 can be configured to detect a change in the interactive medium 152 by observing that the interactive medium 152 is displaced (e.g., along the Y-direction) when the actuator 176 comes in contact with the push button 199. This allows the actuator 176 to detect the position of the push button 199 by contacting various spots on the surface 152' of interactive medium 152 and detecting the position of the push button 199 upon observing a change (e.g., in the displacement along the Y-direction) in the interactive medium 152.

In addition to detecting physical displacement in the interactive medium 152, the actuator 176 can further comprise a sensor (e.g., pressure sensor) that is configured to detect the position of various elements of the interactive medium 152. For example, the sensor 174 can detect a change in characteristics of a screen 152" (e.g., LCD screen) of the interactive medium 152 upon coming in contact with the touch sensitive button 199. For example, the sensor 174 can be a pressure sensor that detects a change in a resistance of the LCD screen 152' of the interactive medium 152 upon coming in contact with the touch sensitive button 199. Generally, any suitable sensor known in the art can be used with the embodiments disclosed herein. For example, the sensor 174 can be a piezoelectric sensor, a pressure sensor, a piezoelectric pressure sensor, a piezomechanic sensor, a piezomechanic pressure sensor, a light sensor, a digital sensor, an audio sensor, etc. Further, in addition or instead of measuring changes in resistance, the sensor 174 can detect the button 199 by detecting changes in other characteristics of the interactive medium 152, such as changes dimension, color, texture, presence of digital text and distinguishing the touch-sensitive display over other surfaces of the interactive medium 152 or the machine 150.

As shown in FIG. 1A, the arm 170, actuator 176, and/or the sensor 174 can be coupled to the distal end 175 of the arm 170 and configured to move in the vicinity of the arm 170. For example, the arm 170 can be movable along at least one dimension about the interactive medium 152 and the actuator 176 can be movable along at least one other dimension. Additionally or alternatively, the actuator 176 can also be configured to move in at least one dimension other than the dimension(s) in which the arm 170 can move. For example, the arm 170 can also be configured to move along the X and Y (horizontal and vertical) in the vicinity of the machine 150, while the actuator 176 moves along the Z dimension over the interactive medium 152. Additionally or alternatively, the arm 170 can also be configured to move in three dimensions (X, Y, Z) in the vicinity of the machine 150, while the actuator 176 rotates over the interactive medium 152.

Referring back to FIG. 1A, the robotic system 100 can further include a visual source 160 that is configured to provide an image of the machine 150. The visual source 160 can be any suitable source that can provide an image of the machine 150, such as a memory that stores previously acquired images of the machine 150 and/or a camera that captures live images of the machine 150 while the machine 150 is within the field of view 101 of the camera. For example, the visual source 160 can comprise a suitable static camera that obtains images of the machine 150 within its field of view, a 360° camera that rotates around the field of view to obtain images of the field of view, a three-dimensional camera that obtains three-dimensional images of the field of view, a dynamic video camera configured to provide a video stream of the field of view. Alternatively or additionally, the visual source 160 can comprise an infrared camera configured for obtaining images of the field of view under low surrounding lighting conditions using infrared radiation and thermography, and/or a dynamic video camera with a lens for capturing an image or a video of the field of view. In some implementations, the visual source 160 can comprise two or more cameras that provide two or more images from two or more fields of views (e.g., as a stream of images).

The images can be digital images and/or analog images that are converted into a digital format and provided by the visual source 160 to the system 100. As described in further details below, the images from the visual source 160 are forwarded to an electronic circuitry 110 having a processor 120 that processes the images and extracts relevant information about the machine 150 and the interactive interface 152 from the images. Various image processing schemes can be used.

The visual source 160 can be connected to the system 100 via any suitable connection. For example, the visual source 160 can be coupled to the system 100 via a communications network 148 and configured to transmit one or more images via the network 148 to the processor 120 for processing. For example, the visual source 160 can transmit two or more images of the machine 150 within the field of view to the processor 120 for use in preparing a three-dimensional image of the machine 150.

The system 100 can further comprise any suitable additional elements that can facilitate capturing of images from the machine 150, recognition of various elements of the interactive medium 152 by the actuator 176, and/or mitigation of impacts of environmental factors during calibration and/or operation of the system 100. For example, the system 100 can comprise a light emitter 162 that is configured to adjust the light intensity in the vicinity of the machine 150 prior to and/or during capture of images by the visual source 160. The light emitter 162 can change the intensity of the light delivered and/or control an angle at which light is delivered before/while images are being captured by the visual source 160 in order to mitigate the negative impact of environmental factors caused by light intensity. Similarly, the system 100 can comprise an audio sensor that can detect audible environmental noise and inform a processor 120 in the digital circuitry 110 of the system of presence of the environmental noise. In response, the processor 120 can initiate one or more actions that reduce and mitigate the audible environmental noise. For example, the processor 120 can adjust the volume of audible instructions provided to the system 100 to mitigate the environmental noise.

Generally, any suitable noise sensor and/or noise reduction/mitigation schemes can be used with the embodiments disclosed herein. For example, the noise reduction techniques can include, but are not limited to, adjusting an intensity of the light at which the images are captured, adjusting an angle of light delivered for image capture, adjusting volume in the instance of audible instructions, and adjusting the humidity that can affect physical feedback of buttons.

As noted, the system 100 can further comprise a light sensor 163 that measures the light intensity of the area surrounding the machine 150 and forwards the measured value to the processor 120 and the electronic circuitry 110. The processor 120 compares the measured light intensity with a predetermined threshold (e.g., stored in a database 140) and determines whether the measured light intensity is sufficient/suitable for capturing images. If the value of light intensity is lower/higher than the predetermined value, the processor 120 can direct the light emitter 162 to generate additional/less light and/or direct the visual source 160 to obtain additional images with adjusted lighting conditions and/or at a different time when lighting conditions are expected to improve. Additionally or alternatively, the processor 120 can cause the visual source 160 to obtain one or more additional images of the machine 150 and/or the interactive medium 152. For example, the visual source 160 can obtain an additional image of the interactive medium 152 from a different viewpoint (e.g., by rotating the camera) or by adjusting intensity of the light (e.g., using a light emitter).

Figure 1B:
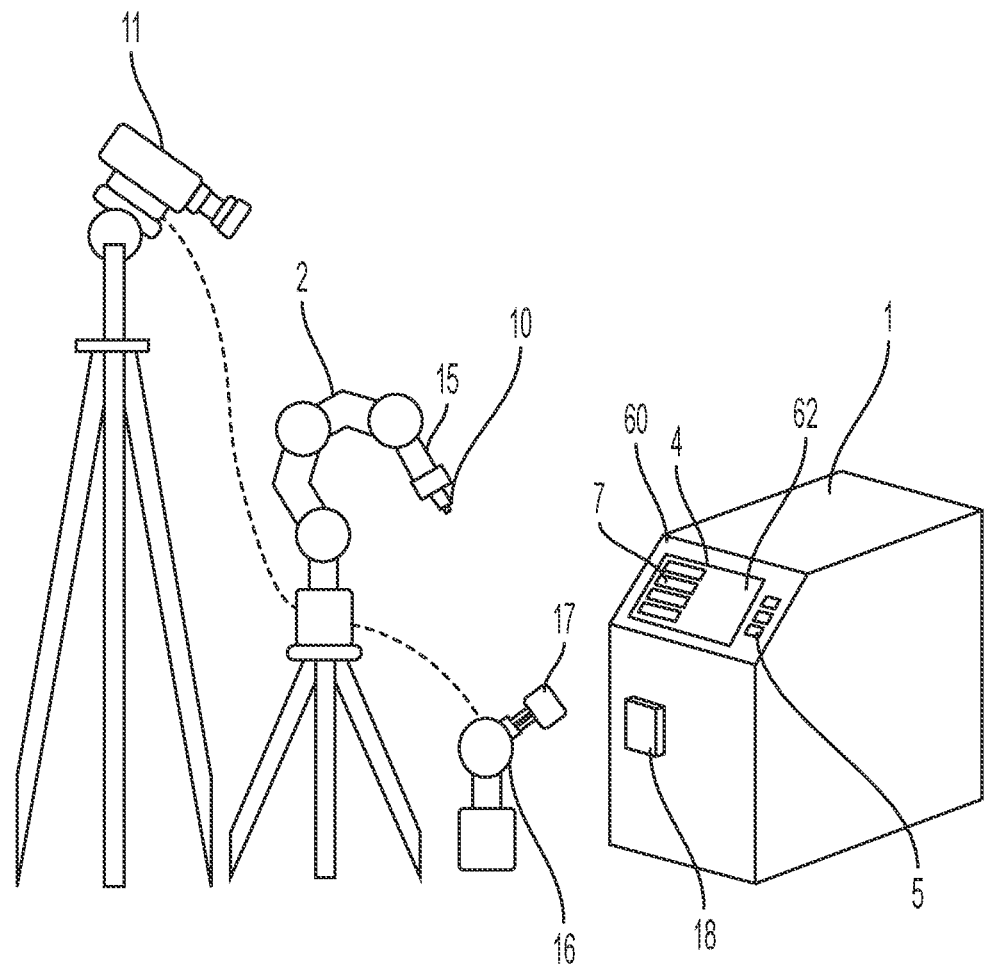
FIG. 1B is a schematic of a system for testing an embedded system of a device, according to some embodiments disclosed herein.
Figure 1C:
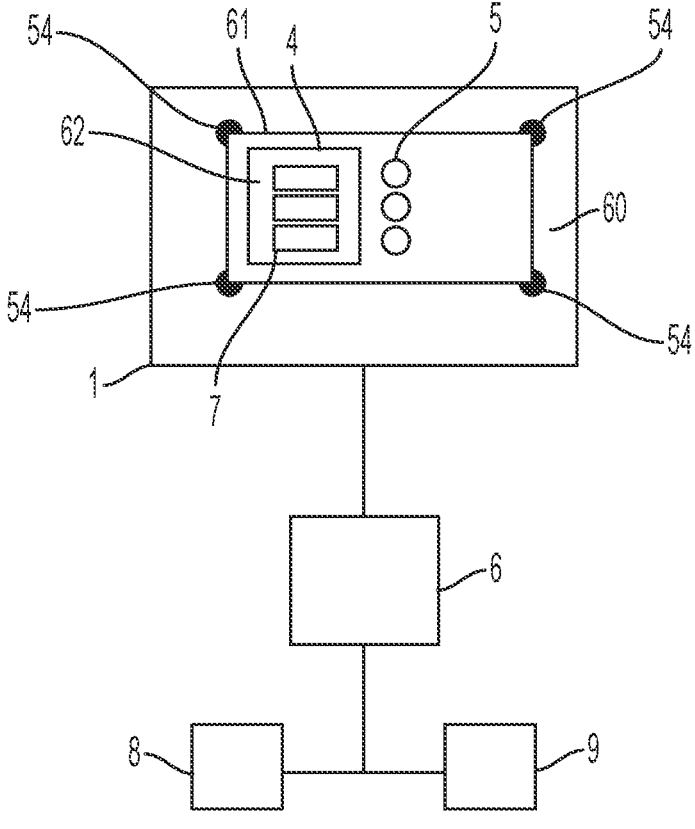
FIG. 1C is a block diagram of an example of an Observable User Interface of a device under test, according to some embodiments disclosed herein.
Figure 1D:
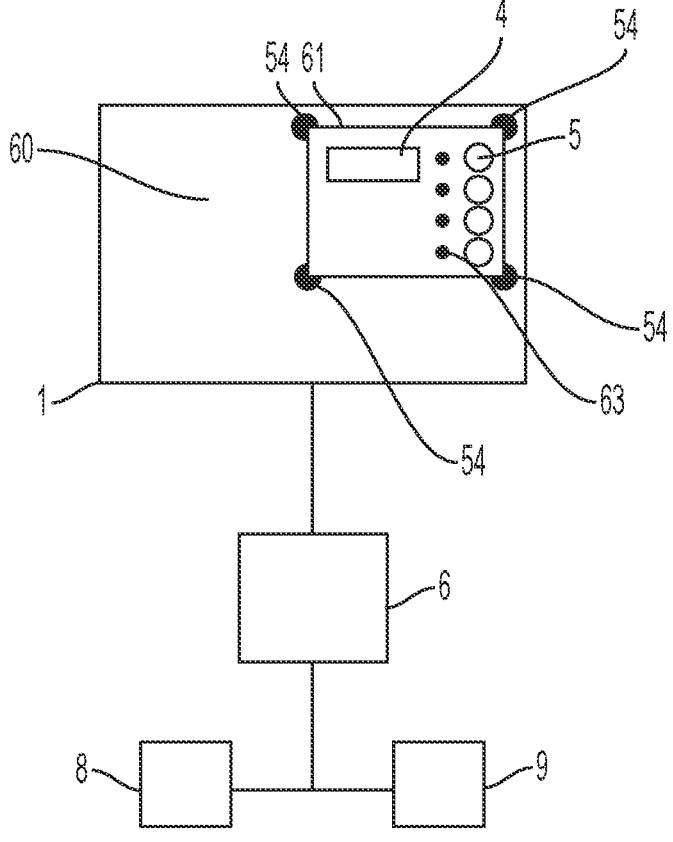
FIG. 1D is a block diagram of an example of an Observable User Interface of a device under test, according to some embodiments disclosed herein.
Figure 1E:
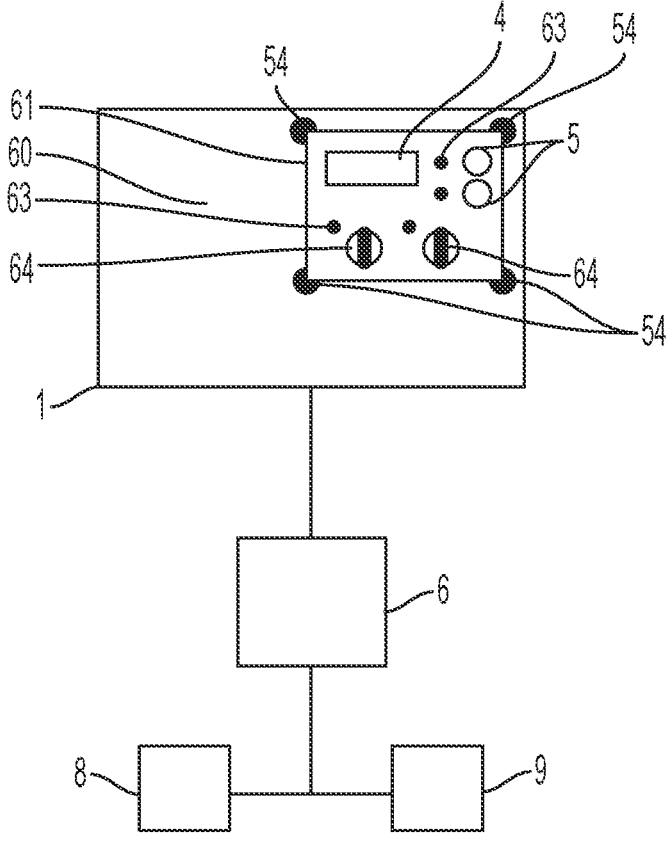
FIG. 1E is a block diagram of an example state of the Observable User Interface of a device under test, according to some embodiments disclosed herein.
Figure 1F:
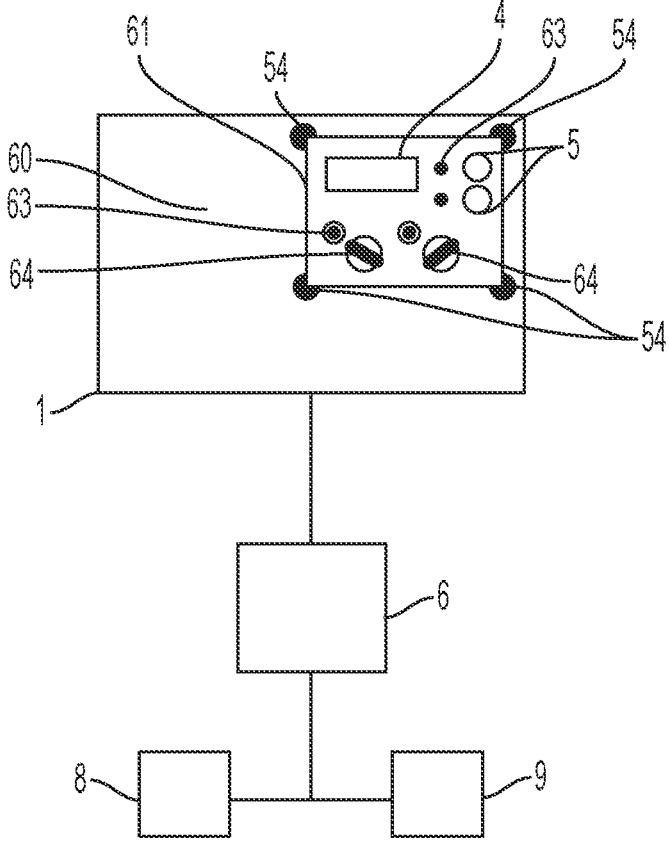
FIG. 1F is a block diagram of an example state of the Observable User Interface of a device under test, according to some embodiments disclosed herein.

FIG. 1B is a block diagram of a system for testing an embedded system 6 of a device 1, according to some aspects disclosed herein. The system for testing an embedded system 6 of a device comprises the device 1 under test, a testing robot 2, and a central control unit 3 and is shown on the FIG. 1B. The device 1 under test comprises at least an observable user interface 61 (OUI) adapted to show a state of the device 1 under test (FIGS. 1C and 1D). As shown in FIGS. 1B-1F, the OUI 61 is provided with at least one button 5 and/or visual indicator 63. The button 5 is a physical device which is used for user-device interaction, as such it may be subjected to pressing, rotating, moving etc., wherein this movement is used to send instructions or requests to the embedded system 6 of the device 1 under test. The visual indicator 63 may be a LED or another light source and is used to identify the state of the device 1 under test. The state of the device 1 under test means whether it is turned off or on, which task is being realized, which option is selected, etc. The settings and tasks performed by the device 1 under test are enabled and activated by the buttons 5 and with the help of the visual indicator 63. The device 1 under test can further comprise a display 4 used to provide visual feedback to the user, show time or other relevant information etc.

The device 1 under test can comprise a display 4 embodied preferably as a touchscreen, at least one button 5 and an embedded system 6. The display 4 is adapted to show screens of a Graphical User Interface 62 (GUI) of the embedded system 6. The screens of the GUI 62 can comprise a welcome screen, loading screen, shutdown screen, and other screens showing various functionalities, such as possible settings of the device 1 under test, list of selectable actions to be performed by the device 1 under test, error screens, menu screens etc. At least one screen has at least one action element 7, which is preferably embodied as a button on the touchscreen of the device; this can be, for example, a menu screen, which has several action elements 7, each of the action elements 7 can represent an option selectable form the menu screen. There can also be screens with no action elements 7, such as loading screen, which generally does not require any user action. The action element 7 itself may not have a physical form but can be implemented rather as an icon on the touchscreen of the display 4. Both the button 5 and the action element 7 are used to interact with the embedded system 6 and are assigned an action which may be different for the button 5 and the action element 7 and may vary from screen to screen. The action is performed upon interacting with the button 5 or the action element 7 wherein the interaction is performed by pressing the button 5 or touching (pressing) the action element 7. The action can then result into changing of the shown screen, or selecting a task from the list of tasks to be performed, cancelling an action, changing settings of the device 1 under test, logging in into the device or logging out etc. At least one screen has a connection to at least one other screen. Connection of the screens means that by performing an action on one screen, the display then shows another screen. Such connection may be presented by, for example, a screen with a list of possible tasks to be performed. Each task can be assigned an action element 7 wherein upon pressing the action element 7 the user is transferred into another screen showing more details about the selected task.

The system can include a screen showing a list of possible settings of the device 1 under test, each setting option being assigned an action element 7, where upon pressing the action element 7 or the button 5, the user is transferred into another screen associated with the selected setting. Some screens may not have a connection to another screen, such as the loading screen which does not require any user input and serves only as a transitional screen. For the device 1 under test to run the software of the embedded system smoothly, it is necessary for it to contain at least a processor 8 and a computational memory 9. For example, the device 1 under test is communicatively coupled to the central control unit 3. Communicative coupling can be realized either physically by a cable, such as ethernet cable or USB cable, or as a contactless coupling via Internet, Bluetooth, or by connecting it into a network. The communicative coupling, however, is not necessary and may not be implemented. In that case, the device 1 under test may act independently of the central control unit 3.

The testing robot 2 (FIG. 1B) can comprise at least an effector 10, a camera 11, a processor 12 with an image processing unit 13, and a memory unit 14. The effector 10 can be adapted to move along at least two orthogonal axes, preferably three. For example, the effector 10 is attached to a first robot arm 15 which guides the movement of the effector 10. The effector 10 is used to simulate physical contact of the user with the display 4, buttons 5, and action elements 7. Should the display 4 be embodied as a touchscreen, the effector 10 can be adapted to interact with the display 4 (e.g., by being made from a material which can interact with the touchscreen). Further, the camera 11 is placed on the testing robot 2 in such a way that it faces towards the display 4. Therefore, the display 4 and the buttons 5 are in the field of view of the camera 11, and the current screen shown on the display 4 is clearly seen by the camera 11. In some implementations, the camera 11 is not placed on the testing robot 2, however, it is placed in such a way, that the display 4 and the buttons 5 are in the field of view of the camera 11. For example, the camera 11 can be placed, for example, on a tripod. The processor 12 of the testing robot 2 is adapted to control the actions of the testing robot 2 via software installed thereon. The actions of the testing robot 2 which the processor 12 controls include controlling the movement of the first robot arm 15 and the effector 10, communicating with the central control unit 3, and operating the camera 11. The testing robot 2 is communicatively coupled to the central control unit 3. Communicative coupling can be realized either physically by a cable, such as ethernet cable or USB cable, or as a contactless coupling via Internet, Bluetooth, or by connecting it into a network.

As shown in FIG. 1B, the testing robot 2 further comprises a second robot arm 16 equipped with a communication tag 17, and the device 1 under test further comprises a communication receiver 18. The second robot arm 16 is adapted to put the communication tag 17 near the communication receiver 18 when instructed by the processor 12. The communication tag 17 is preferably embodied as an RFID tag in a chip or a plastic card. In other embodiments, any communication tag 17 based on the RFID or NFC communication protocol may be used. Other forms of wireless communication or connection standards, such as BlueTooth, Infrared, WiFi, LPWAN, 3G, 4G, or 5G, are possible as well. The communication tag 17 includes an RFID chip which is activated when placed in the proximity of the communication receiver 18, which continually emits signal in a radio frequency spectrum. Upon activating the communication tag 17 an action in the device 1 under test can be performed. For example, a task to be performed by the device 1 under test, such as printing a document, is awaiting a confirmation wherein confirmation takes place by verification of the user. Each user can have a communication tag 17 assigned in the form of a card. Verification is then done by placing the communication tag 17 in the vicinity of the communication receiver 18.

The testing robot 2 can further comprise a sensor 19 adapted for detecting a performed action. The sensor 19 can be a camera, photocell, motion sensor, noise sensor, etc. The sensor 19 can be used for detecting the performed action if its result cannot be seen on the display 4. For example, when the device 1 under test is a printer, the action can be printing a paper. A prompt for a user to print a document can be shown on the display 4, where the prompt can be confirmed either by pressing the action element 7 or by placing the communication tag 17 near the communication receiver 18. After confirmation, the document is printed. This action, however, cannot be seen by the camera 11, as it is focused mainly on the display 4 of the device 1 under test (e.g., the printer). The printing itself can be detected by the sensor 19, for example if the sensor 19 is a camera, the printed paper is seen by the camera, or a movement is detected by a movement sensor, such as photocell, in a particular area where the document emerges from the printer.

The central control unit 3 may be in a personal computer with at least a monitor and a PC mouse; as such, the central control unit 3 comprises a processor 20 and a memory unit 21. The central control unit 3 is used to control the whole process as described further in the application and ensures communication between itself and the testing robot 2. The device 1 under test may be separate and may work independently on the central control unit 3. However, the device 1 under test may be communicatively coupled to the central control unit 3 if the device 1 under test allows such connection.

Further, the device 1 under test can be any suitable device (e.g., a printer). Further, the device can be any device with implemented embedded system 6, either with GUI 62 or other form of OUI 61. The OUI 61 may not comprise a touchscreen or even display 4, however, it can comprise another visual indicator 63, such as a LED or other form of light indication. The following list of devices is not limiting the scope of protection given by the claims. Devices which comprise a touchscreen may be a printer, tablet, smartphone, control panel for industrial use, cash registers, information kiosks, ATMs, terminals, smart home gadgets etc. Devices only with a display 4 not embodied as a touchscreen may be a microwave, radio, calculator, any of the devices named in the previous list etc.

Descriptor Constructing

Figure 1G:
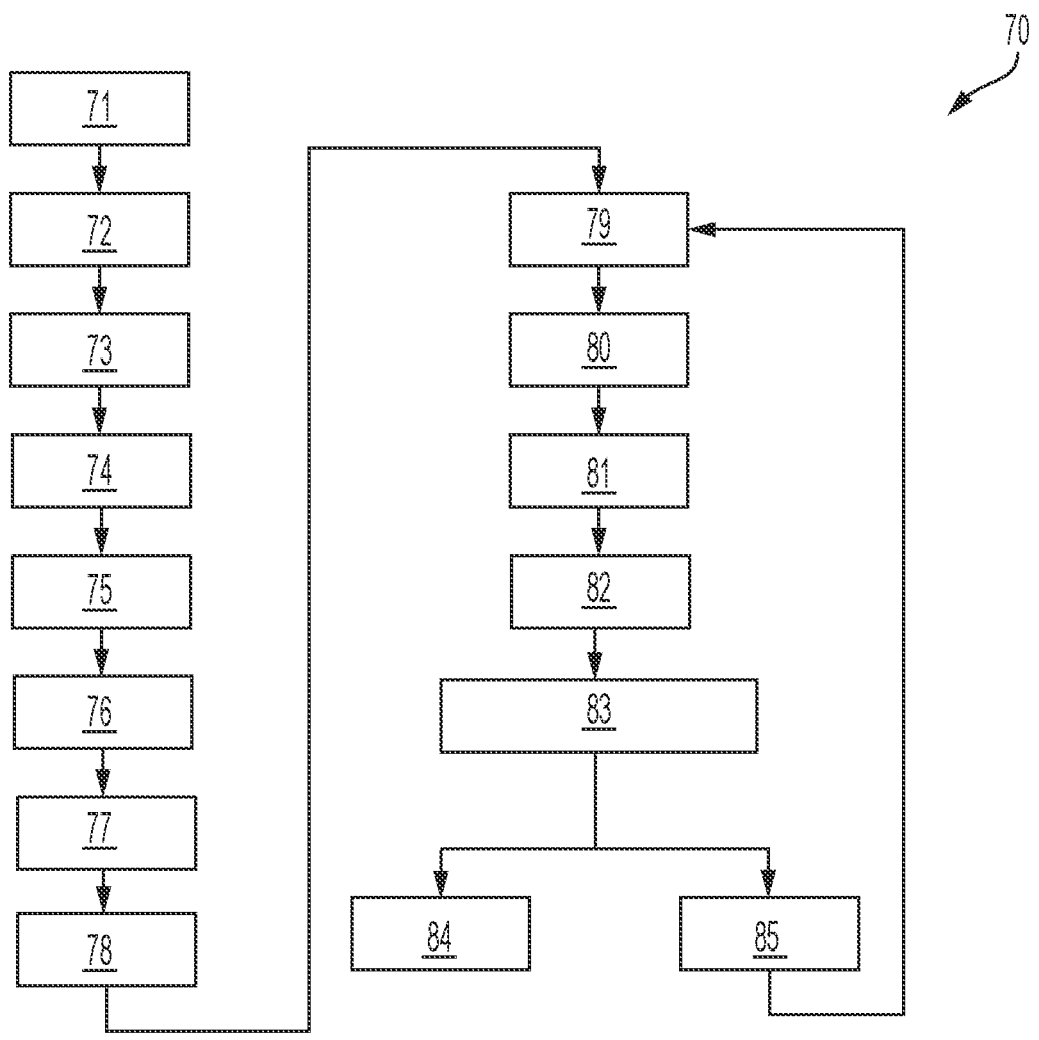
FIG. 1G is a flow diagram of a method of constructing a descriptor, according to some embodiments disclosed herein.

For characterization of the image, a numerical value is used. These numerical values stored in vector format are called descriptors and can provide information about the color, texture, shape, motion, and/or location of the image. On order to describe an image in more detail, a more specific descriptor needs to be used. Descriptors can be in various shapes and lengths and provide different numerical or verbal description of the processed image. For example, a descriptor providing information about color distribution in the image can have different numerical value, length and shape than a descriptor providing information about the shape of the image, as the color distribution can be described by one alphanumerical value with an information about the average color of the image, such as #FF0000, #008000, #C0C0C0 etc., and the shape can be described by a vector having two numerical values length and width of the image. Another descriptor can be used to describe average color and shape of the image. This descriptor can be represented by a vector with three values, one providing an information about the color and two about the size. The method of constructing a descriptor 70 is described in the FIG. 1G and detailed below.

In order to construct a descriptor 70, a picture 72 with an empty descriptor 71 is obtained. An image 50 of the device 1 under test comprises a region of interest, such as a control panel 60. To extract the region of interest 73, the image 50 is cropped so that only the region of interest containing relevant information is shown in the cropped image 51, where the region of interest is preferably the OUI 61. Cropping is used to remove any part of the image, which is not relevant for further processing, as it does not contain useful information to make the image-processing part of the method faster.

The descriptor can be used to describe an image of the OUI 61 of various devices with display. As the optical sensor 11 captures an image, a portion of the device 1 under test, where the display 4 is placed, can be seen too. Since the image of the device 1 under test itself does not carry relevant information, it can be removed from the picture without a loss of important information. To make the process of finding the region of interest easier, various marks 54 can be placed on the device 1 under test to highlight the position of the region of interest. An example of highlighting the region of interest of the image is shown in FIGS. 1C-1F. In these figures, the front panel of the device 1 under test provided with the display 4 is shown. Usually, the display 4 comprises a rectangular shape. To highlight the position of the OUI 61 on the device 1 under test, a set of marks 54 placed in the corners of the rectangle forming the OUI 61 can be arranged. With these marks 54, it is easier for an image processing unit 13 to determine the position of the region of interest faster and with better accuracy.

Once the region of interest is cropped from the original image 50, the image 50 is converted into a binary edge image 75. In this format, pixels forming the image can achieve only two values 0 and 1, marking either a black or a white pixel, respectively. Generally, the image 50 can be converted into a grayscale image 74. Depending on the average intensity of the pixel, a threshold value of the pixel intensity is chosen. The pixels with value lower than the threshold value are then converted to a black pixel, whereas the pixels with value higher than the threshold value are converted to a white pixel. The threshold value is not constant for every processed image, it rather changes with the overall quality of the image and conditions of the surroundings. Binary edge image can be divided into rows and columns, wherein the maximal value of rows and columns is given by the size of an image in pixels, e.g. image of the format 640×480 could be divided up to 640 rows and 480 columns etc.

In some implementations, the image can be divided into another number of rows and columns. However, with the decreasing number of the divided rows and columns, the informational value of the descriptor decreases rapidly too. Further, two histograms can be created to count non-zero value pixels in each row and column 76. The first histogram counting the number of non-zero value pixels in each row, the second histogram counting the number of non-zero value pixels in each column. Both of these histograms are normalized 78 and after this step, two sets of numbers are available. The first set of numbers contains numbers representing a normalized histogram of non-zero value pixels in each row, the second set of numbers contains numbers representing a normalized histogram of non-zero value pixels in each column. The normalized values are added to the empty descriptor 78. These two sets of numbers are the first two values of the constructed descriptor. Further, the cropped image 51 can be divided with a horizontal dividing line and vertical diving lines into equal sectors 79, the non-zero value pixels in each row and column in each sector are counted 80, the counted values are normalized 81, and added to the descriptor 82 until desired iteration is reached 83 and the procedures are completed 84. The procedures can be repeated as 85 as detailed below.

The cropped image 51 can be divided with a vertical dividing line 52 into two halves-left and right. The halves need not to be of the same size. The left half and the right half can divided into columns, wherein the total number of columns is the same as the number of columns in the undivided image. A histogram representing the number of non-zero value pixels in the columns of the first half can be constructed and normalized. Further, a histogram representing the number of non-zero value pixels in the columns of the second half is constructed and normalized. These procedures can be carried out in any order.

The cropped image 51 can be divided with a horizontal dividing line 52 into two halves top and bottom. The halves need not to be of the same size. The top half and the bottom half can be divided into rows, wherein the total number of rows is the same as the number of rows in the undivided image. Further, a histogram representing the number of non-zero value pixels in the rows of the first half is constructed and normalized. A histogram representing the number of non-zero value pixels in the rows of the second half is also constructed and normalized. These two steps are interchangeable, meaning it does not matter which histogram is created first. Furthermore, it does not matter whether the image is first divided with a vertical line or a horizontal one.

Upon completing the procedures, four more sets of numbers are available. The first set of numbers contains numbers representing a normalized histogram of non-zero value pixels in the columns of the left half of the image, the second set of numbers contains numbers representing a normalized histogram of non-zero value pixels in the columns of the right half of the image, the third set of numbers contains numbers representing a normalized histogram of non-zero value pixels in the rows of the top half, and the fourth set of numbers contains numbers representing a normalized histogram of non-zero value pixels in the rows of the bottom half. These four sets of numbers are added to a descriptor, which now has the total of six values–sets of numbers. The order of the sets of numbers in the descriptor is irrelevant. However, all the descriptors must have the same form, thus the order of the sets of values must be the same for every descriptor constructed.

Additional sets of numbers can be constructed in accordance with the process described above. The cropped image 51 can be divided with two vertical dividing lines 52 into three thirds—left, middle, and right. The thirds need not to be of the same size. The left third, the middle third and the right third can be divided into columns, wherein the total number of columns is the same as the number of columns in the undivided image and the image divided in two halves. Further, a histogram representing the number of non-zero value pixels in the columns of the left third is constructed and normalized. A histogram representing the number of non-zero value pixels in the columns of the middle third is constructed and normalized. Further, a histogram representing the number of non-zero value pixels in the columns of the right third is constructed and normalized. These three steps are interchangeable, meaning it does not matter which histogram is created first.

The cropped image 51 is divided with two horizontal dividing lines 52 into three thirds—top, middle, and bottom. The thirds need not to be of the same size. The top third, the middle third and the bottom third are divided into rows, wherein the total number of rows is the same as the number of rows in the undivided image and the image divided in two halves. A histogram representing the number of non-zero value pixels in the rows of the top third is constructed and normalized. Further, a histogram representing the number of non-zero value pixels in the rows of the middle third is constructed and normalized. A histogram representing the number of non-zero value pixels in the rows of the bottom third is constructed and normalized. These three steps are interchangeable, meaning it does not matter which histogram is created first.

Upon completing the procedures, six more sets of numbers are available. The first set of numbers contains numbers representing a normalized histogram of non-zero value pixels in the columns of the left third of the image, the second set of numbers contains numbers representing a normalized histogram of non-zero value pixels in the columns of the middle third of the image, the third set of numbers contains numbers representing a normalized histogram of non-zero value pixels in the columns of the right third of the image, the fourth set of numbers contains numbers representing a normalized histogram of non-zero value pixels in the rows of the top third of the image, the fifth set of numbers contains numbers representing a normalized histogram of non-zero value pixels in the rows of the middle third of the image, and the sixth set of numbers contains numbers representing a normalized histogram of non-zero value pixels in the rows of the bottom third of the image. These six sets of numbers are added to a descriptor, which has the total of twelve values–sets of numbers. The order of the sets of numbers in the descriptor is irrelevant. However, all the descriptors can have the same form, thus the order of the sets of values can be the same for every descriptor constructed.

The images can be analogically and further divided into quarters, fifths etc. to the maximum applicable division number being the lower number of the size of the image in pixels. Given that the division order is N, it is clear that by division we create 2N new histograms to be added to the descriptor. The preferred embodiment of the method divides the image to up to three parts, however, the number of divisions is not limiting the subject of the invention.

Descriptors constructed according to the method described in the paragraphs above can be further used to identify an image. For example, a descriptor can be implemented either in the testing robot 2 or the central control unit 3. Implementation can be performed in software. For example, the testing robot 2 or the central control unit 3 can have a software installed thereon, wherein the purpose of the software is to create a descriptor of a given image. As an input, the software can receive an image and the output of the software can be a descriptor of the given image. For example, the image processing unit 13 can receive an input in the form of an image 50 captured by the camera 11, wherein a part of the image 50 forms a region of interest, such as a display 4 of a device 1 under test, or the OUI 61. The image 50 can further be cropped so that only the region of interest is in the cropped picture. A descriptor is constructed as detailed above and stored in the memory unit 14. The output of the image processing unit 13 can, therefore, be the descriptor of the inputted cropped image 51.

As each of the sets of numbers represents a number of non-zero value pixels in a row or a column of a given sector, the opposite method of constructing the descriptor of the image is also applicable. The opposite method can work with a number representing zero value pixels as opposed to using a number of non-zero value pixels.

Furthermore, counting only non-zero value pixels also represents zero value pixels, as the total number of pixels in each row or column given by a sum of these two numbers, the mutual relationship of these two numbers can be given by simple formulas $N_0 = N - N_1$ and $N_1 = N - N_0$, where $N_0$ is the number of zero value pixels, $N_1$ is the number of non-zero value pixels and N is the total number of pixels in given row or column.

Further, the cropped image 51 can be divided into so called sectors 53 using the horizontal or vertical dividing lines 52. The sectors can be halves, thirds, quarters etc., of the cropped image 51 and should be of the same size. Each sector 53 comprises lines and rows of pixels forming the cropped image 51. The rows and columns may be further divided into groups, wherein the group consists of at least one row or column. The histogram is be counted for each group of each sectors.

Image Classification

The embedded system 6 of the device 1 under test can use the display 4 to show the user information about task progress, state of the device, options, settings etc. in the Graphical User Interface (GUI) 62. The user can interact with the user interface, wherein the feedback of the embedded system 4 is usually shown in a form of a screen on the GUI 62. The user interface can comprise input elements, such as buttons 5, touchpad, trackpoint, joystick, keyboard etc. to receive input from the user. Should the display 4 of the device 1 under test be a touchscreen, it can also comprise the action elements 7 implemented in the GUI 62. Touching the input element or the action element 7 can result in a feedback of the device 1 under test and an action may be performed, screen on the display 4 can be changed, the device 1 under test can be turned on or shut down etc. For further use, all possible screens, states of the visual indicators 63, current settings etc. make up the states of the device 1 under test. Changing of the screen shown in the GUI 62, lighting up the visual indicator 63, performing an action etc. mean that the state of the device 1 under test has been changed.

Screens showed on the display 4 of the user interface can be sorted into classes describing their purpose or meaning, e.g., title screen showing a logo of a company with a loading bar, login screen asking the user to put in credentials, error screen informing the user about failing a task, screen with a list of tasks, operations available to the user, screen showing settings of the test device, language options, list of information about the state of the device etc. Some of these screens can be shown in various forms with only slight differences between them, such as login screen with empty slots for username and password, partially filled with only a username, or fully filled. As the username and password for various users can have different lengths, the screens with filled in credentials can differ subtly. For the purpose of testing the device 1 under test, the differences between these pictures can be noted. Further, testing system can also note that these pictures are similar, and all belong to the same class—login screen.

Further, A list of tasks to be performed can be shown on the display of the test device. Should the device be a printer, for example, the task list can show a queue of documents to be printed, their order, size, number of pages, etc. Task list can change its form depending on the number of tasks to be performed, some of the tasks may be selected to be deleted from the queue and as such, they can be highlighted, or a selected symbol can appear in their vicinity. The testing system should note that these pictures are similar, and all belong to the same class task list screen.

All possible screens of the GUI 62 displayed on the display 4 that need to be recognized should be manually assigned to classes by a person. This way, it is ensured that all the images of the screens are assigned to the correct class. Further, an authorized person can review as many images of the GUI 62 screens as possible to cover all classes which will be used for sorting the screens of the GUI 62. During manual sorting, the authorized person can be prompted to mark and highlight action elements 7 on the screen which are they assigning to a class. Furthermore, the authorized person can manually mark a position and size of the action element 7 and assign an action to this action element 7. The action can refer to the instruction the action element 7 passes to the embedded system 6. The action element 7 can thus be e.g., an OK button confirming an action performed by a user. Another example of an action element 7 can be a "Log In" button confirming user's credentials and logging them into the system. Further examples of the action elements 7 can be cancelling button, close window button, sign up button, confirm action button, each task can operate as an action element 7, arrow buttons for navigating around the GUI, or any text field etc. When assigning a screen to a class, it is thus necessary to mark all action elements 7 in the screen and assign an action to be performed to each of the action elements 7. The action may lead to closing window, logging up, changing the screen, selecting a task to be performed, etc. It is therefore possible to change screens by pressing an action element.

Further, the display 4 of the device 1 under test can be placed on the control panel 60 of the device 1 under test. Device 1 under test can comprise the embedded system 6 adapted to receive user input in form of instructions via action elements 7 implemented in the touchscreen, or via interactive elements, such as the buttons 5. The user can use the action elements 7 and interactive elements to interact with the device 1 under test, to perform tasks.

Furthermore, at least one screen can have a connection to at least one other screen meaning that upon interaction with the action element 7 or the interaction element, the original screen is transferred into the following screen to which it is connected. There can be some screens with no action elements 7 assigned which thus have no connection to any other screen. This screen can be for example a loading screen, a welcoming screen after the device 1 under test is turned on, or a shutdown screen after the device 1 under test is shut down. Each class of screens can thus contain many more screens in their variety or with subtle changes as discussed above.

In some implementations, the device 1 under test may not comprise a touchscreen or GUI 62 which requires a user-device interaction. The feedback to the user is provided rather by visual indicators 63, such as LED, LCD panel etc. In this case, the device 1 under test may be situated in a plurality of states. The states of the device 1 under test include the actions being performed by the device 1 under test, its informational feedback, its current setting etc. For example, should the device 1 be an oven (FIGS. 1E and 1F), the control panel 63 includes two knobs 64, first knob 64 adapted to change the mode of the oven (turned on, grill, heating up, heating down, hot air mode etc.), the second knob 64 adapted to change the temperature settings, two visual indicators 63, the first indicating whether the oven is turned on, the second indicating whether the heating is on or off, in other words whether the desired temperature is reached. The oven may further comprise a display 4 with clock and two buttons 7 used to set the timer of the oven, time of the clock, etc. The selected mode, the current setting being set, the set temperature, state of the visual indicators 63 make up all the possible states of the oven. The oven is in a first state when it is shut down. By rotating the knob 64 the user selects the operational mode of the oven and thus changes the state of the oven, this is usually accompanied by switching on the first visual indicator 63. By rotating the second knob 64, the user sets a desired temperature and thus changes the state of the oven, this is usually accompanied by switching on the first visual indicator 63, see FIG. 1F. It is thus necessary to obtain pictures of all possible states of the oven, localize buttons 7 or knobs 64 and assign them a function which changes the state of the oven to another state. The pictures are assigned a descriptor and classified.

Decision-Making Module

The central control unit 3 comprises a decision-making module 22, preferably embodied as a neural network. The decision-making module 22 is implemented in the central control unit 3 in a software form. The decision-making module 22 comprises a trained classifier. The classifier is trained on a dataset comprising either a set of descriptors of classified images of states of the device 1 under test, or classified images of states of the device 1 under test, or a set of descriptors of classified images of states of the device 1 under test together with classified images of states of the device 1 under test.

As described above, all possible states of the device 1 under test are manually identified and sorted into classes. Each of the states is assigned a descriptor according to the method described above. To create even larger dataset for training of the classifier of the decision-making module 22, the images of the screens can be captured in various conditions, such as—lighting, size, angle of the camera 11 with respect to the device 1 under test, display 4 brightness, contrast, sharpness of the image etc. Images of the same state of the device 1 under test obtained in various conditions form a batch. For every classified image of the state of the device 1 under test, the identifying descriptor is created and assigned. It is obvious that the descriptors for images of a given batch are similar, but not the same, as the image was obtained in different conditions.

The classifier is trained on a dataset comprising either the descriptors of the sorted images of states of the device 1 under test, the images of states of the device 1 under test, or the combination of both. The bigger the training dataset is, the more accurate is the trained classifier. After training, the classifier is prepared to sort images or descriptors into given classes. In the sorting process, the classifier takes as an input an image of the state of the device 1 under test or a descriptor of the given image and is able to assign the image or the descriptor to a right class. Understanding that the classifier is not always completely accurate, to improve the accuracy of the classifier, it is recommended to enlarge the training dataset by capturing one image of a given state of the device 1 under test in various conditions, such as: display brightness, color contrast, lighting conditions, angle and distance of the camera from the display etc. These images are depicting the same states of the device 1 under test. When cropped, their informational value will be the same even though the images themselves are a little different. For that reason, the descriptors of these images will be a little different too. This way, after the training of the classifier is performed, it will classify the images of the screen more accurately.

Method for Testing an Embedded System

The method for testing the embedded system 6 of the device 1 under test comprises a series of procedures. Specifically, a set of images depicting at least two states of the device 1 under test can be created. This set of images is saved in a memory unit 21 of the central control unit 3. The set of images can comprise every possible state of the device 1 under test. For at least one state of the device 1 under test, at least one action element 7 and connecting to at least one other state of the device 1 under, test can be assigned. Connecting is applied when the action element 7 of the current state of the device 1 under test or a button 5 is pressed. After pressing, the current state of the device 1 under test changes to another state of the device 1 under test to which the initial one is connected. An identifying descriptor is then assigned to each of the images of the state of the device 1 under test. The descriptor is a numerical value, preferably a set of numerical values in vector form, describing the current state of the device 1 under test. The descriptor of the state may vary a little depending on the current conditions under which the image was obtained. In general, the descriptors of different states of the device 1 under test are different and should not be interchanged.

Figure 1H:
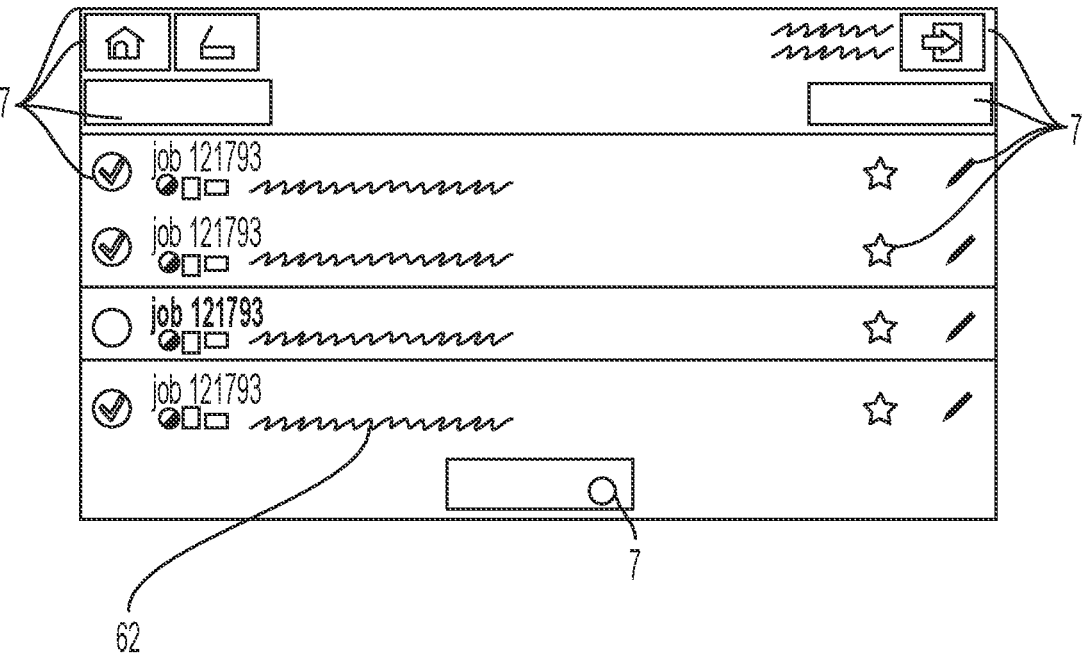
FIG. 1H is an example step of a method of processing an image, according to some embodiments disclosed herein.
Figure 1I:
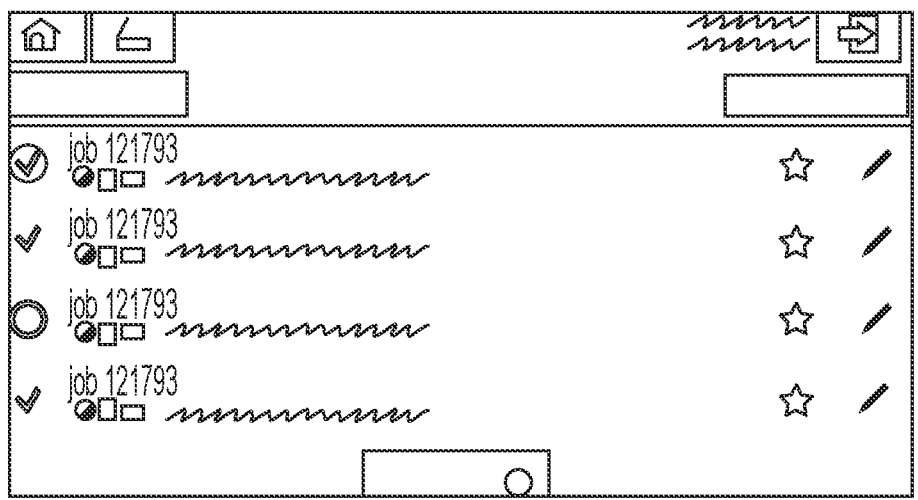
FIG. 1I is an example of procedures for processing an image, according to some embodiments disclosed herein.
Figure 1J:
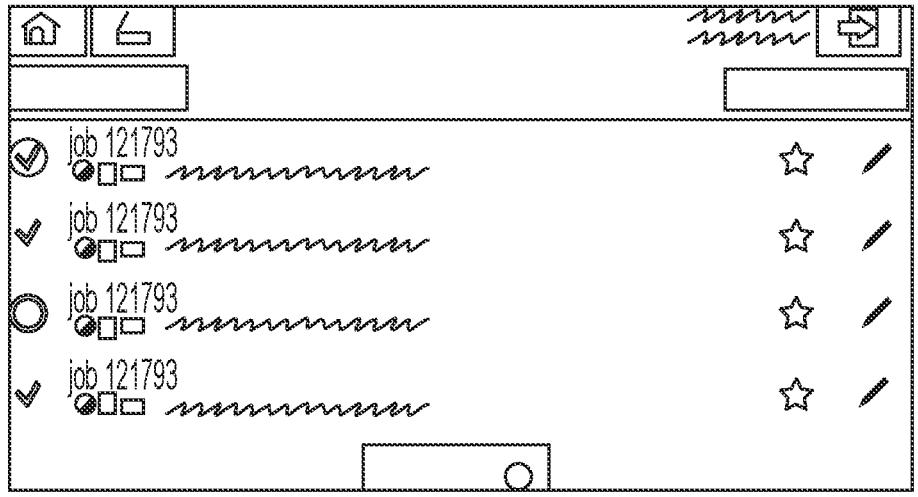
FIG. 1J is an example of procedures for processing an image, according to some embodiments disclosed herein.

In the next steps (FIGS. 1H-1J), an image of the device 1 under test is captured with the camera 11 of the testing robot 2. The photo taken by the robot 2 is cropped so that only a picture of the OUI 62 itself is shown. The image is then saved and stored in the memory unit 14 of the testing robot 2 or in the memory unit 21 of the central control unit 3. A current descriptor is assigned to the image of the stored state and compared with the identifying descriptors stored in the memory unit 21 of the central control unit 3. The comparison process is performed by decision-making module. The current descriptor of the current image of the device 1 under test is used as an input for the neural network and as an output, the current state of the device 1 under test is determined with certain accuracy. As the current descriptor of the obtained image depicting the current state of the device 1 under test is a little different than the identifying descriptor associated with the state of the device 1 under test that is saved in the central control unit 3, the direct comparison is less effective and accurate than using the neural network. After the current state of the device 1 under test is determined, the position of the action element 7 on the display 4 or the button 5 on the control panel 60 is determined and the effector 10 is moved so that the action element 7 or the button 5 is pressed.

Figure 1K:
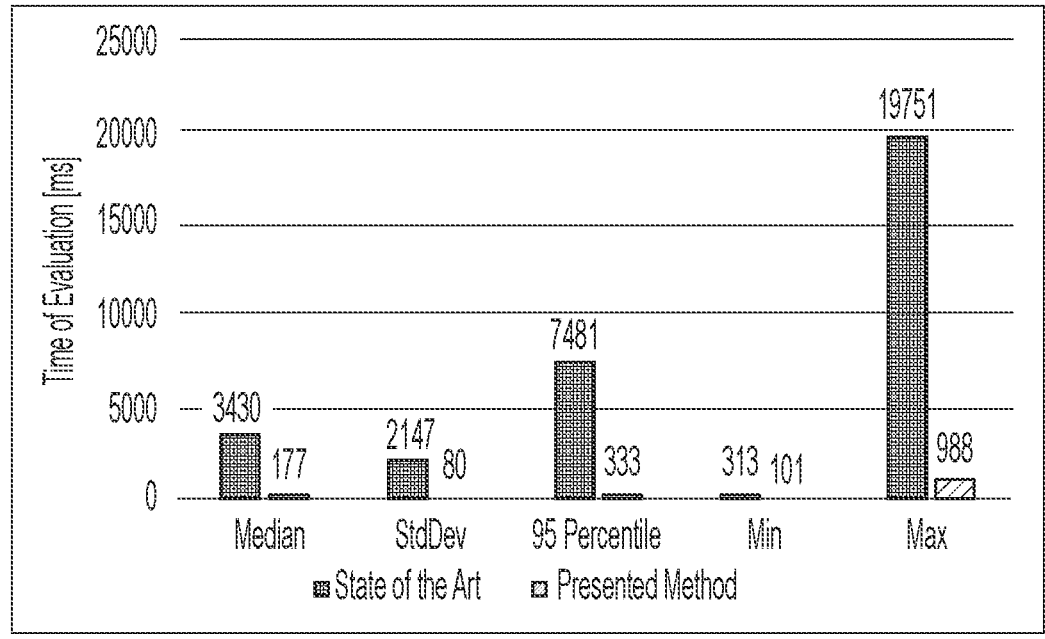
FIG. 1K is example graph of comparative results of the time of evaluation according to some embodiments disclosed herein.

The method for testing the embedded system 6 of the device 1 under test can be further used to measure response time and reaction time of the embedded system 6. When the action element 7 or the button 5 of the current state of the device 1 under test is pressed, the time measuring is initiated. Once the screen on the display 4 or the state of the device 1 under test in general is changed the time measuring is ended, and the value of the time passed is stored in the memory unit 21 of the central control unit. Afterwards, the state of the device 1 under test can be determined. This way, one can measure the time the embedded system 6 takes to perform various operations, such as time required for changing of various screens on the GUI 62 or changing of the states of the device 1 under test (as shown in FIG. 1K).

The testing robot 2 can further comprise a sensor 19, such as a motion sensor, heat sensor, noise sensor, or an additional camera. This sensor 19 is adapted to detect whether an action was performed. In the preferred embodiment, the device 1 under test is a printer. The action can thus be printing of a document. The sensor 19 is then used to detect whether the document was printed. For example, a camera or a motion sensor is placed to monitor the area to which the printed document is placed, upon detecting the movement it is clear that the document was successfully printed. This can be used for measuring the time-to-print. In this embodiment of the method, the user is prompted to confirm the printing action via the GUI 62. In other words, the screen with printing instruction is shown on the display 4. This instruction can be confirmed manually, by pressing the action element 7 associated with confirming the action, such as an OK button.

For example, the device 1 under test may be an oven, wherein the sensor 19 may be a heat sensor placed inside the oven. The testing robot 2 gives the oven a task to heat up to e.g. 200° C. which changes the state of the oven by lighting up the visual indicator. When the oven reaches the required temperature, the sensor 19 sends an information about the performed action to the testing robot 2. It is clear that the above-mentioned examples are just illustrative and do not limit the scope of the invention just to printers and ovens.

The robot 2 can comprise a second robot arm 16 provided with a communication tag 17, such as card or chip based on the RFID or NFC communication protocol. The printer or other device 1 under test then further comprises a communication receiver 18 which is adapted to communicate with the communication tag 17. The confirming of the action can then be performed by putting the communication tag 17 in the vicinity of the communication receiver 18. Once the action is confirmed by either of the methods described in this paragraph, time measuring is initiated. As the action in the example is printing a document, the document is printed and detected by the sensor 19. Upon detection, the time measuring is ended, and the measured time value is stored either in the memory unit 14 of the robot 2 or the memory unit 21 of the central control unit 3.

Figure 2:
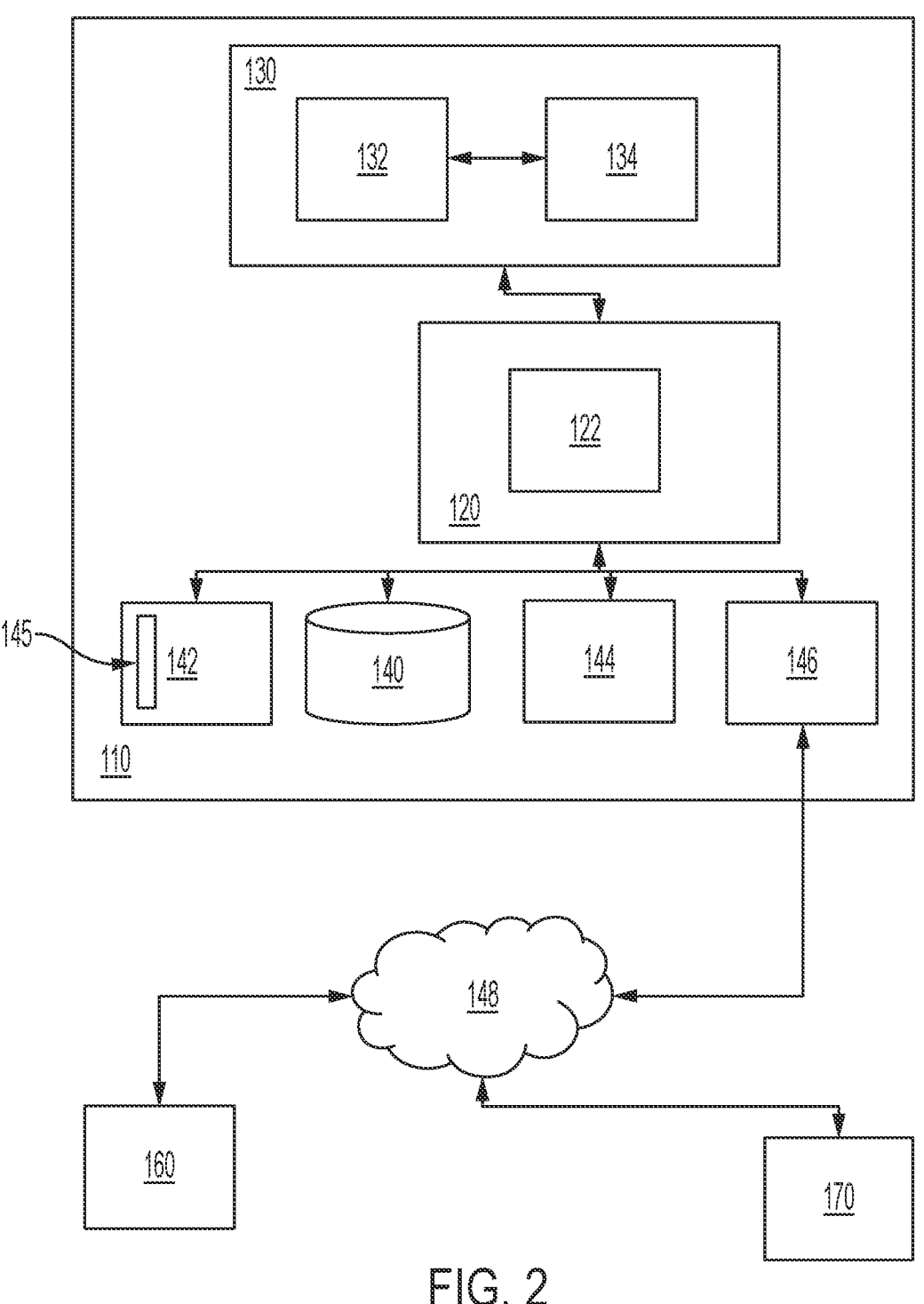
FIG. 2 is a block diagram of an electronic circuitry, according to some embodiments disclosed herein.

FIG. 2 is a high-level block diagram of an electronic circuitry 110 that can be used with the embodiments disclosed herein. As noted above, the electronic circuitry 110 can include a processor 120 that is configured to monitor the operation of the robotic system 100, send and/or receive signals regarding the operation of the robotic system 100 and the machine 150.

The processor 120 can be configured to collect or receive information and data regarding the operation of the robotic system 100 and/or the machine 150 and/or store or forward information and data to another entity (e.g., another portion of the robotic system). The processor 120 can further be configured to control, monitor, and/or carry out various functions needed for analysis, interpretation, tracking, and reporting of information and data used or collected by the arm 170, the visual source 160, and other components of the system 100 (e.g., actuator, sensors, light emitters, etc.).

Generally, these functions can be carried out and implemented by any suitable computer system and/or in digital circuitry or computer hardware, and the processor 120 can implement and/or control the various functions and methods described herein. The processor 120 can be connected to a main memory 130, and comprise a central processing unit (CPU) 122 that includes processing circuitry configured to manipulate instructions received from the main memory 130 and execute various instructions. The CPU 122 can be any suitable processing unit known in the art. For example, the CPU 122 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively or additionally, the processor 120 can comprise at least one of a multi-core processor and a front-end processor.

Generally, the processor 120 and the CPU 122 can be configured to receive instructions and data from the main memory 130 (e.g., a read-only memory or a random-access memory or both) and execute the instructions. The instructions and other data can be stored in the main memory 130. The processor 120 and the main memory 130 can be included in or supplemented by special purpose logic circuitry. The main memory 130 can be any suitable form of volatile memory, non-volatile memory, semi-volatile memory, or virtual memory included in machine-readable storage devices suitable for embodying data and computer program instructions. For example, the main memory 130 can comprise magnetic disks (e.g., internal or removable disks), magneto-optical disks, one or more of a semiconductor memory device (e.g., EPROM or EEPROM), flash memory, CD-ROM, and/or DVD-ROM disks.

The main memory 130 can comprise an operating system 132 that is configured to implement various operating system functions. For example, the operating system 132 can be responsible for controlling access to various devices, memory management, and/or implementing various functions of the robotic system 100. Generally, the operating system 132 can be any suitable system software that can manage computer hardware and software resources and provide common services for computer programs.

The main memory 130 can also hold application software 134. For example, the main memory 130 and application software 134 can include various computer executable instructions, application software, and data structures, such as computer executable instructions and data structures that implement various aspects of the embodiments described herein. For example, the main memory 130 and application software 134 can include computer executable instructions, application software, and data structures, which can be employed to operate the machine 150 with the robotic system 100 as well as image processing software used to process images obtained by the visual source to extract information about the machine and/or visual interface.

Generally, the functions performed by the robotic system 100 can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers).

The main memory 130 can also be connected to a cache unit (not shown) configured to store copies of the most frequently used data stored in the main memory 130. The program codes that can be used with the embodiments disclosed herein can be implemented and written in any form of programming language, including compiled or interpreted languages, and can be deployed in any form, including as a stand-alone program or as a component module, subroutine, or other unit suitable for use in a computing environment. A computer program can be configured to be executed on a computer or on multiple computers, at one site or distributed across multiple sites and interconnected by a communications network, such as the Internet.

The processor 120 can further be coupled to a database or data storage 140. The data storage 140 can be configured to store information and data relating to various functions and operations of the robotic system 100 and/or the machine 150. For example, the data storage 140 can store the data collected by the robotic system 100, detected changes in surrounding environmental conditions (e.g., change in lighting detected by the visual source 160) during image capture of the machine 150, etc.

The processor 120 can further be coupled to an interface 142. The interface 142 can be configured to receive information and instructions from the processor 120. The interface 142 can generally be any suitable display available in the art, for example a Liquid Crystal Display (LCD) or a light emitting diode (LED) display. For example, the interface 142 can be a smart and/or touch sensitive display 145 that can receive instructions from a user and/or provide information to the user for operating the machine 150 with the robotic system 100.

The processor 120 can further be connected to various interfaces. The connection to the various interfaces can be established via a system or an input/output (I/O) interface 144 (e.g., Bluetooth, USB connector, audio interface, FireWire, interface for connecting peripheral devices, etc.). The I/O interface 144 can be directly or indirectly connected to the robotic system 100.

The processor 120 can further be coupled to a communication interface 146, such as a network interface. The communication interface 146 can be a communication interface that is included in the robotic system 100 and/or a remote communication interface 146 that is configured to communicate with the robotic system 100. For example, the communications interface 146 can be a communications interface that is configured to provide the robotic system 100 with a connection to a suitable communication network 148, such as the Internet. Transmission and reception of data. information, and instructions can occur over the communication network 148. Further, the communication interface 148 can be an interface that is configured to allow communication between the electronic circuitry 110 (e.g., a remote computer) and the robotic system 100 (e.g., via any suitable communications means such as a wired or wireless communications protocols including WIFI and Bluetooth communications schemes).

Figure 3:
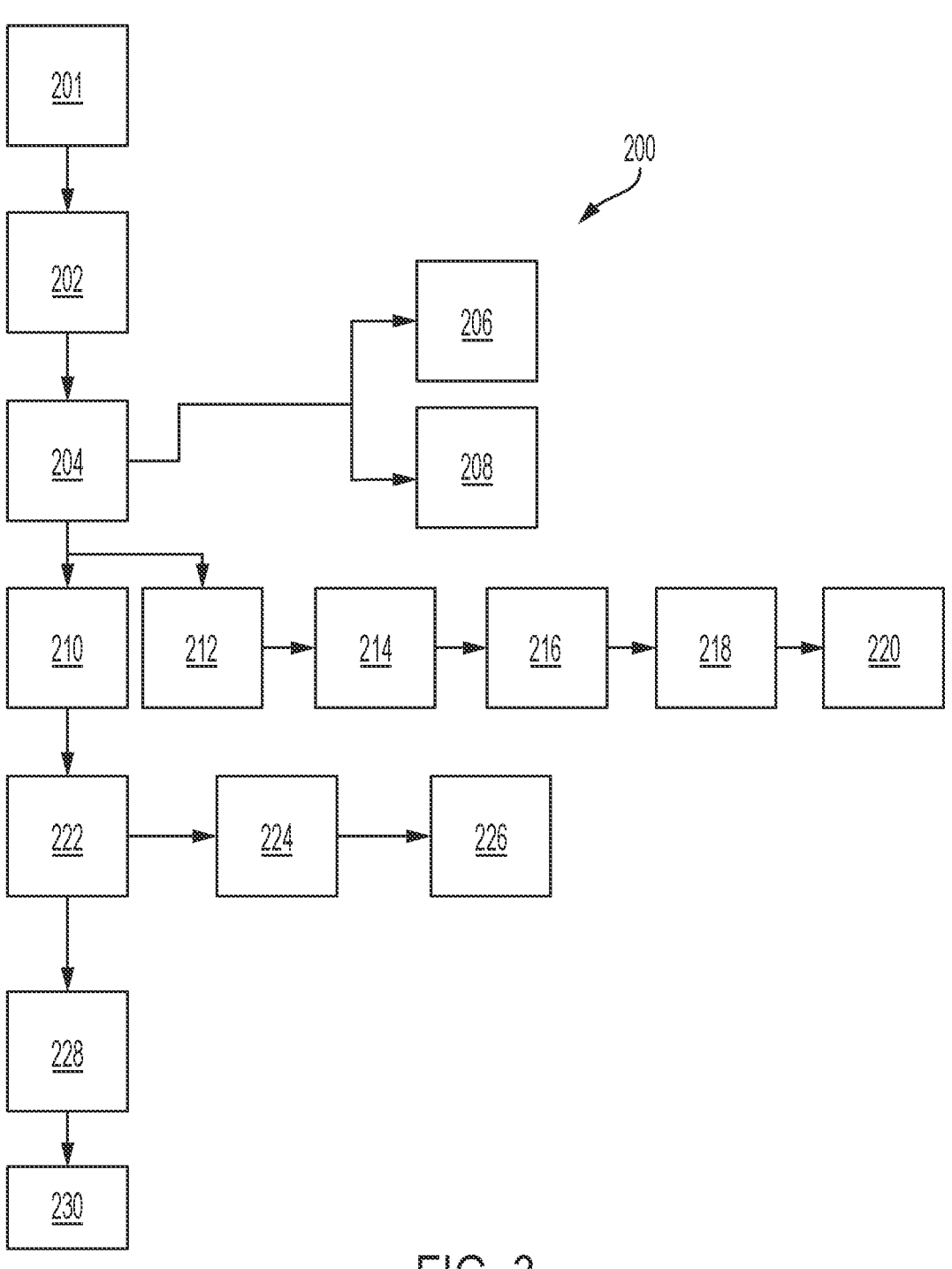
FIG. 3 is a flow diagram of the procedures for operating the robotic system, according to some embodiments disclosed herein.

FIG. 3 is a high-level flow diagram of the procedures for operating the robotic system 100 according to some embodiments disclosed herein. In order to define the dimensions of the interactive element (e.g., operated screen) 201, the procedures can calibrate the visual source (e.g., camera) 202 and the arm (e.g., robot) 204 to ensure accurate interaction between the arm 170 and the machine 150.

During the calibration stage, images obtained by visual source 160 can be assessed for the amount and quality of information. For example, the images from the visual source 160 can be reviewed to determine if they provide sufficient data for locating the machine 150 and/or the interactive medium 152 in the field of view 101 and additional images can be obtained as needed.

Further, the processor 120 can evaluate and score the images based on their respective quality and information provided by the specific image and the processor 120 can discard images that have a score below a predetermined level. The score can generally be assigned to the image any suitable metric for evaluating in the information in the image. For example, the score can be assigned based on a probability of presence of sufficient data in the image for extracting information about the machine 150 and/or the interactive medium 152. Specifically, the processor 120 can evaluate the images and assign a score to each image that indicates a probability that the image can provide sufficient data for detecting the information about the machine 150 and/or the interactive medium 152.

Alternatively or additionally, the images can be scored based on the amount of information available in each image for identifying the machine 150, the interface, or the interactive medium 152 within the field of view 101 and/or based on a probability of accurate detection of the characteristic of the interactive medium 152. As noted, the processor 120 can exclude images having a score lower than a predetermined score from being used for identifying the interface or the interactive medium 152 within the field of view and/or employ images having a score higher than a predetermined score for identifying the interface or the interactive medium 152 within the field of view 101.

As noted, upon determining that additional data are needed for accurate detection of the machine 150 or interface, the processor 120 can adjust the camera to obtain an additional image in an additional field of view 101. Specifically, the processor 120 can be coupled to a frame upon which the cameras has been moveably mounted. If the processor 120 determines that additional images from other viewpoints are needed, it can direct the camera frame to change the position and/or orientation of the camera to obtain additional images in other fields of view 101. The adjustment of camera can comprise any suitable adjustment, for example an adjustment of an angle of the camera.

Further, as noted above, the processor 120 can be connected to one or more light emitters and/or light sensors and adjust the intensity of the light emitted by the light emitter prior to obtaining the additional images. Other sensors can be used to collect additional visual data. For example, light sensors, infrared cameras, optical sensors, light emitters, and other actuators can be used to collect data regarding light intensity, lighting conditions. device display settings, and distortions. In response to the collected date, the processor 120 can make further adjustment to the visual source 160.

As noted with reference to FIG. 1A, the arm 170 can further be activated to move in the vicinity of the machine 150 and actuate an actuator 176 that further obtains data on the machine 150 and interactive medium 152. Specifically, during arm calibration 204, the arm 170 and/or can interface with the interactive medium 152 and the machine 150 (under the direction of the processor 120) to locate the boundaries of the machine 150 and the location/position of the interactive medium 152 and its various elements.

The pressure sensor 174 can be coupled to the distal end 175 of the arm 170 and configured to indicate a change in resistance when the distal end 175 of the arm 170 interfaces with the interactive medium 152 of the machine 150. Additionally or alternatively, the actuator 176 can detect a change in the placement of a button 199 in the interactive medium 152. For example, the system 100 can be configured such that the arm 170 moves in a first dimension while the actuator 176 that is coupled to the arm 170 move in a second dimension that is different from the first dimension. In order to calibrate the machine 150, the processor 120 can analyze an image provided by the visual source 160, and extracts, from the image, some information about the interface within the field of view 101 (e.g., location or orientation of the interface). The arm 170 and actuator 176 can use this information to move about the identified area of the machine 150 (e.g., in the vicinity of the machine and the interface) and identify the interface (e.g., by physically coming in contact with the machine and interface and recording its features in response to the physical contact). The actuator 176 can further move in the vicinity of the identified interface and observe possible changes in the interface in response to contacting the interface. For example, the actuator 176 can sense a change in response to coming in contact with a physical key (e.g., movement of the key) or a touch screen key (e.g., pressure sensor sensing a change in the amount of pressure applied). The change observed by the actuator 176 is recorded and used to determine features of the interactive medium 152. Further, information obtained from the visual source 160 can be used to determine features such as shape, color, etc. of the interactive medium 152.

The arm calibration 204 can be a semi-automated process 206, with at least some user input for interfacing with the interactive medium 152 of the machine 150. The user input for the arm-calibration 204 can be provided by the user through the communications network 148 and communication interface 146.

Additionally or alternatively, the arm calibration 204 can be a fully automated process 208 without requiring user-input. For example, as explained above, the visual source 160 of the robotic system 100 can include two or more cameras configured to provide two or more images from two or more fields of views for forming a stream of images to obtain a three-dimensional image of the machine 150. The three-dimensional image of the machine 150 can be used to determine metrics for the interactive medium 152 of the machine 150 in three-dimension, which can be processed by the processor 120 and the application software 134 to automate the arm calibration 204.

Generally, the metrics obtained using the arm 170, actuator 176, and the visual source 160 can include any information that can assist the system 100 in determining features of the machine 150 and the interactive medium 152 within the field of view (e.g., location of the machine 150 within the field of view, orientation of the machine 150 within the field of view, dimensions of the interface with the interactive medium 152 within the field of view, location of the interface with the interactive medium 152 within the field of view, and boundary of the interface with the interactive medium 152 within the field of view). The extracted metrics can be stored in the main memory 130 of the robotic system 100 for use to carry out the tasks performed by the system.

Metrics (e.g., dimension, position, location in space, orientation) of the interactive medium 152 of the machine 150 and elements of the UI interface of the interactive medium 152 can be determined through a fully automated process that is executed by the application software 134 and the processor 120. For example, the screen and user-interface (UI) capture 210 can be carried out by the processor 120 by comparing and matching images captured by the visual source 160 with pre-captured images of the screen and UI 212, which have been extracted from data provided to the robotic system 100. The data can be provided to the system 100 by a user or obtained from databases that store such data. For example, the data can be extracted from documents provided by the user to the robotic system 214 (e.g., an original manual of the machine 150 or an online resource). The robotic system can comprise text recognition capabilities that provides the robotic system with the ability to extract information about the machine 150, screen, and/or user-interface and apply the information in identifying these elements.

Further, the processor 120 of the robotic system 100 can carry out an image scoring process 216 on the pre-captured images of the screen and UI 212. The image scoring process 216 can include scoring the images based on the amount of information included in the image and/or quality of the image (for example based on a probability of accurate detection of the characteristics of the interactive medium 152 in the images). The image scoring process 216 can further include excluding images that score 218 below a predetermined score used for identifying the interactive medium 152 within the field of view and retain images that score above the predetermined score used for identifying the interactive medium 152 within the field of view for further processing by the processor 120. The retained images can be stored in the memory for future use by the robotic system 220. The memory can be a local memory of the robotic system or be a remote memory or database that is connected to the system via a communications network (e.g., database stored in the cloud).

The robotic system can further define and determine tasks 222 that can be carried out using the machine 150 via the interface. These actionable tasks can be tasks that have been previously defined (e.g., by a user) and/or be tasks that are determined by the arm 170 and actuator 176 via interaction with the machine 150. Specifically, the robotic system 100 can determine based on data provided to the system (e.g., by a user) that performing a certain task (e.g., action A) via the interface results in a certain outcome (e.g., outcome A'). Additionally or alternatively, the robotic system can determine based on interaction with the interface that performing certain tasks (e.g., action B) can result in a certain outcome (e.g., outcome B') 222.

Further, the robotic system can determine and develop a list of such actionable tasks by repeatedly interacting with the machine 150 via the interactive medium 152, performing tasks, and recording the outcome associated with each task. This provides the machine 150 with the ability to learn from repeated interactions with the interface and develop a library of actions and corresponding actionable tasks. Specifically, the system can determine that interacting with the interactive medium 152 and performing certain actions (e.g., actions C, D, and E) result in certain corresponding outcomes (e.g., outcomes C', D', and E'). The system can develop an action dictionary/database that stores the actions and/or some information about the actions, such as the visual appearance or location of the keys involved in performing the action. The system can further develop an outcome dictionary/database that stores the outcomes associated with each action. The dictionaries (databases) developed by the system can store any suitable information for identifying the actions and outcomes (actionable items). For example, the dictionaries can comprise a glyph dictionary that store information on the interactive element items used for performing an action 224 (e.g., characteristics of a button on the interactive medium 152). At any point during this learning process, a user can provide input to the system to correct or modify an action. For example, the user can provide information regarding any features or elements of the interactive interface that have not been correctly identified by the machine 150 during the learning process 226. Alternatively or additionally, the user can provide information regarding actions that have not been identified by the system.

As noted, while defining actionable items, the retained images that score above the predetermined score can be used to identify actions that can be performed via the interface and their corresponding actionable items.

Further, the UI elements contained in the retained images can be compared with a dictionary 224 (e.g., a glyph dictionary, stored in the memory 130). The dictionary 224 can include a database comprising a collection of images including at least one of: common UI elements, the actions corresponding the characteristics of the interface shown in images, actionable items shown in images, and other capabilities of the interactive medium as images. As noted, user-input for the meaning of unrecognized UI elements 226 can be required for UI elements in the retained images that cannot be matched in the dictionary.

The system can further assign scores to tasks and their corresponding outcomes based on evaluating the tasks and outcomes for their optimality. Specifically, the system can determine that two or more tasks can result in the same outcome and review the two or more tasks and rank/score the tasks based on factors such as time, cost, efficiency, number of steps involved, etc. In some implementations, tasks having a score lower than a predetermined score can be discarded and tasks having scores higher than the predetermined threshold can be employed to achieve a desired outcome. Alternatively or additionally, the system can use the tasks having the highest score to achieve the desired outcome.

The system can further determine a flow creation that indicates an order of procedures to follow to perform a task and store this order for use in performing the tasks. Tasks can further be ranked and scored in a similar manner as above and higher scored tasks can receive priority, as detailed above, over lower scored tasks.

Figure 4:
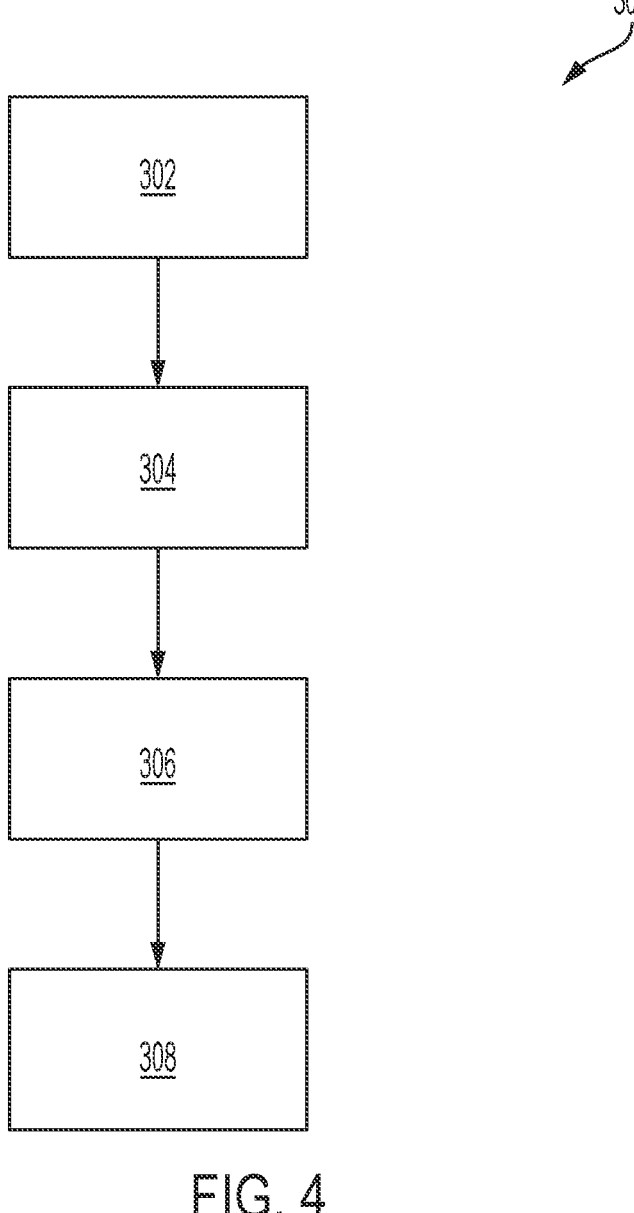
FIG. 4 is a flow diagram of the procedures for calibrating a robotic system, according to some embodiments disclosed herein

FIG. 4 is a flow diagram of the procedures for calibrating a robotic system, according to some embodiments disclosed herein. For example, the procedures 300 can be used to obtain additional information from the visual source 160. As explained above, the system can obtain data received from various sensors as well as information received from the visual source 160 and analyze the data and information to determine various features of the interface and the machine (302-304). If the system determines that additional data me required for identifying the interface and/or the machine 150, the system 100 can prompt the visual source 160 (e.g., camera) to obtain additional images and/or prompt the sensors to obtain additional data 306. The system 100 can further can employ procedures that enhance the capture of additional data (e.g., improve lighting conditions, change device display settings. enhance image distortions, change the angle of a camera 308, and etc.) to enhance the capture of the additional data 308.

As noted above, any suitable sensor can be employed to obtain data. For example, light sensors, infrared cameras, optical sensors, light emitters, and/or other actuators can be used to collect data, including light intensity, lighting conditions, device display settings, and distortions. Further, in some implementations, other sensors 178 (e.g., a digital sensor) can be used to identify, determine, and/or adjust display settings of the interactive medium 152 of the machine 150.

As noted above, the data received from the other sensors 178 can be processed by the processor 120 to assess the conditions under which images have been captured and improve the quality and amount of information obtained from additional images. For example, the system can employ a light sensors to measure the light intensity of the environment surrounding the machine 150 and compare the light intensity with a stored predetermined threshold of light intensity. If the light intensity is determined to be under the predetermined threshold, the system can rigger recapture of the images of the field of view of the machine 150 by the visual source 160 under changed lighting conditions (e.g., by employing a light emitter to emit additional light, capturing the images at a different time of the day, and/or capturing images after changing a brightness of the interactive medium 152.

Further, the robotic system 100 can be adjusted to meet the desired conditions for image capture. For example, the visual source 160 of the robotic system can include a light emitter 162 that can be triggered to provide a source of light for the capture of the images by the visual source 160 in response the light sensor measuring a light intensity of the surrounding lower than the predetermined threshold of light intensity. The light emitter 162 of the visual source 160 can also be adjusted to provide light with a range of different intensities and/or provide light from different angles. The visual source 160 of the robotic system 100 can also be adjusted to capture the images of the machine 150 at a time of the day when the light sensor measures the light intensity of the surrounding to be higher than the predetermined threshold light intensity. Additionally or alternatively, the visual source 160 can include an infrared camera configured to capture images under low light intensities in the event the light intensity of the surrounding is determined to be lower than a predetermined threshold.

Figure 5:
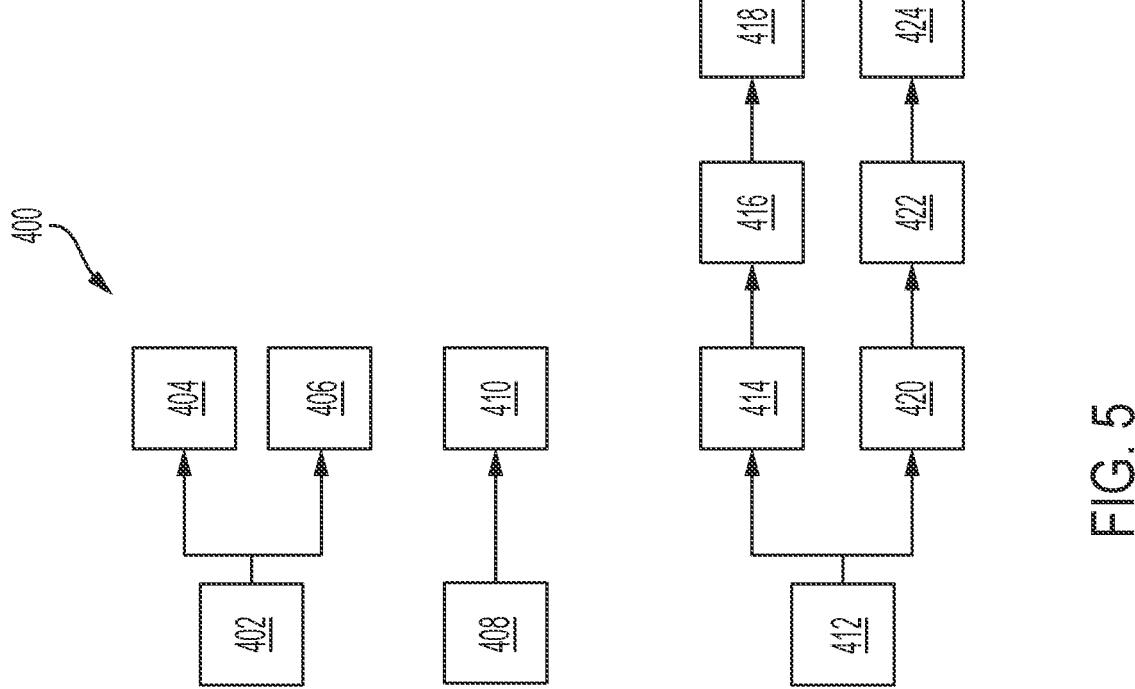
FIG. 5 is a flow diagram for the preparing a dictionary of the elements of the interactive medium, their associated tasks, and/or associated physical outcomes, according to some embodiments disclosed herein.

FIG. 5 illustrates a flow diagram 400 for the preparing a dictionary 224 (e.g., glyph dictionary) of the elements of the interactive medium 152, their associated tasks, and/or associated physical outcomes (actionable items). As shown in FIG. 5, the dictionary 224 can be prepared using a supervised learning 402, an observational learning 408, or an unsupervised learning 412.

The supervised learning dictionary 224 can be prepared by providing the system with input received from a user, including information relating to known interactive medium 152 elements (e.g., their images) their relevant meanings 404, their associated tasks and physical outcomes. The user-input can optionally include glyph images and relevant meanings present in documents provided to the robotic system 100 by the user (e.g., manual of the machine 150 or an online resource). In some implementations, the processor 120 can present the dictionary elements (e.g., glyph images) and their associated meanings, tasks, and outcomes to the user for confirmation 406. Further, the dictionary 224 can be updated following the user confirmation 406. Additionally, the updated dictionary 224 can be used for the identification of actionable items and their relevant capabilities contained in the retained images as discussed in the sections above.

Additionally or alternatively, the dictionary 224 can be formed by observing a user's actions 410 in response to interaction with the UI elements in one or more images provided by the visual source 160. Specifically, the visual source 160 can store images showing the user interact with the elements of the interactive element to perform a task and achieve an outcome. The processor 120 of the robotic system 100 can process such images to identify the relevant UI elements and their associated tasks and outcomes. This information can be used to update the dictionary 224 to identify the UI elements, their associated tasks and outcomes.

Additionally or alternatively, the dictionary 224 can be created and updated without requiring user input via direct interaction of the arm 170 and actuator 176 with the machine 150 and the interactive element. This unsupervised learning approach 408 allows the system to interact with the machine 150 and discover the elements of the interactive medium 152 and their associated tasks and outcomes. In addition to learning from direct interaction with the machine 150, the system can also update the dictionaries by reviewing images obtained from previously obtained images 418 of the machine 150 and the interactive medium 152 and/or associated tasks and outcomes and expand its knowledge of the machine 150 and the interactive medium 152. As noted above, the system can use pre-recorded documentation (e.g., user manuals), on-line resources, and/or other available image and information 418.

In some embodiments, a glyph dictionary that stores images of the elements of the interactive medium 152, associated tasks, and/or their outcomes can be formed by the system and used to carry out the functions disclosed herein 420, 422, and 424. For example, glyphs can be used to describe actionable items and desired outcomes corresponding to tasks performed using the elements on the interactive medium 152.

Figure 6:
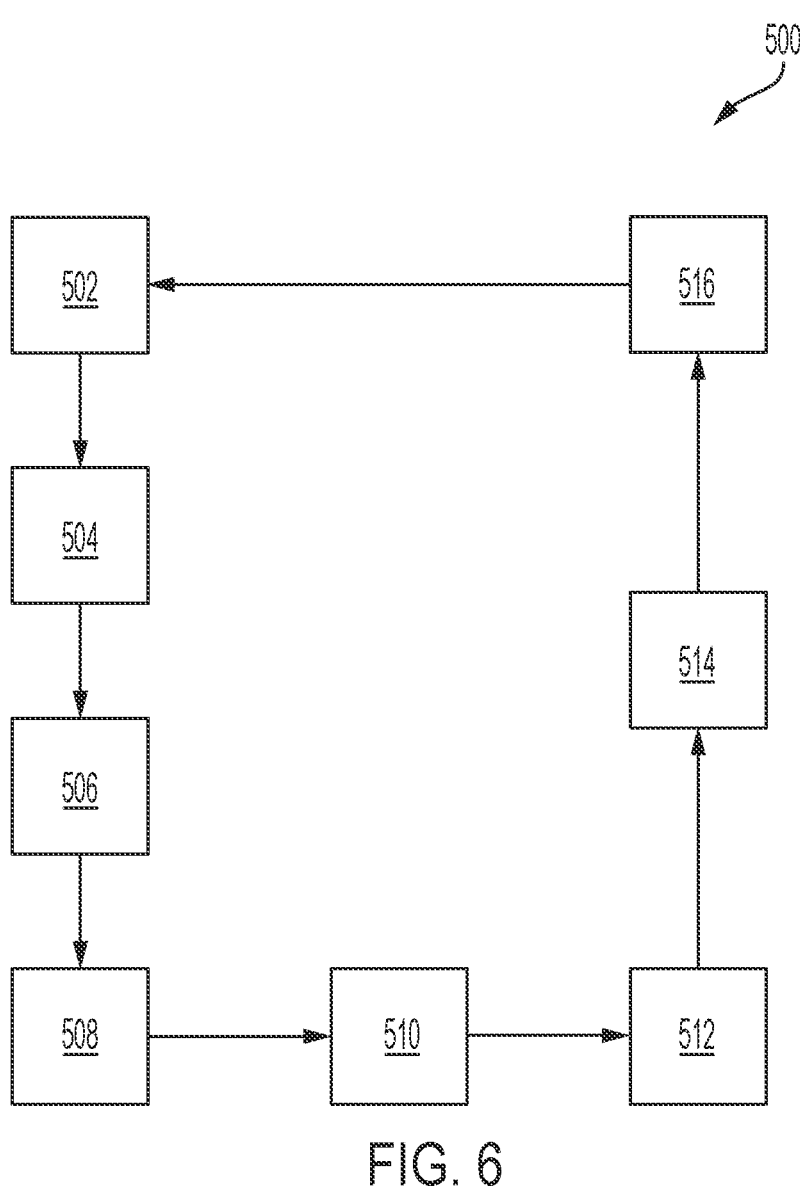
FIG. 6 is a flow diagram of the procedures for identifying the preferred physical task for performing using the machine, according to some embodiments disclosed herein.

FIG. 6 illustrates a flow diagram 500 of the procedures for identifying the preferred physical task for performing using the machine 150. As shown in FIG. 6, the procedures for identifying the preferred physical task for performing using the machine 150 include identifying the physical task for performing using the interactive medium 152 for the operation of the machine 150 includes capturing the state of the machine 502, collecting data from the sensors 504, interpreting data from sensors 506, determining a list of physical tasks 508, ranking the list of physical tasks 510, creating a task plan with the ranked list of physical tasks 512, identifying the highest ranked physical task 514, and executing the highest ranked physical task 516.

As explained above, the robotic system 100 can be used to identify the present status of the machine 150 in relation to performing the preferred physical task by collecting data from the sensors 504 and interpreting the data from the sensors 506. The sensors for collecting data from the sensors 504 and interpreting the data from the sensors 506 can include pressure sensors, light sensors, infrared cameras, optical sensors, light emitters, and other actuators to collect data including light intensity, lighting conditions, device display settings, and distortions. For example, the data from the pressure sensor 174 coupled to the distal end 175 of the arm 170 can be configured to indicate the change in resistance when the distal end 175 of the arm 170 interfaces with the interactive medium 152. Further, data from the light sensors can be used to measure light intensity of the surrounding. During interpreting the data from the sensors 506, the data collected during collecting data from the sensors 504 is processed by the processer 120 of the robotic system 100 to present status of the machine 150. Identifying the present status of the machine 150 can be used to determine the list of physical tasks 508 capable of being performed by the machine 150.

The list of physical tasks 508 capable of being performed by the machine 150 can be used for ranking the list of physical tasks 510 from a physical task with the lowest ranking to a physical task with the highest ranking for creating the task plan with the ranked list of physical tasks 512. For example, for ranking the list of physical tasks 510 is performed by the processor 120 of the robotic system 100 by comparing the list of physical tasks with a goal of operation of the machine 150. Further, the goal of operation of the machine can be user defined and the list of physical tasks can be compared with the glyph dictionary 224 stored in the main memory 130 of the robotic system 100 for ranking the list of physical tasks with regard to achieving the goal of operation of the machine 150. Further, ranking of the list of physical tasks 510 can also be changed by user-input.

A task plan with the ranked list of physical tasks 512 can be prepared by storing a list of physical tasks arranged from a physical task with a lowest ranking to a physical task with a highest ranking for achieving the goal of operation of the machine 150. Further, the robotic system 100 can be configured to perform the physical task with a higher ranking before a physical task with a lower ranking.

The robotic system 100 can be used for identifying the highest ranked physical task 514 from the list of physical tasks arranged from a physical task with a lowest ranking to a physical task with a highest ranking for achieving the goal of operation of the machine 150 and executing the highest ranked physical task 516. For example, the physical task having the highest ranking can be identified as the preferred task for performing using the machine 150 for achieving the goal of operation of the machine 150. Further, the arm 170 can be directed by the processor 120 of the robotic system

100 to perform the preferred task for achieving the goal of operation of the machine 150.

Figure 7:
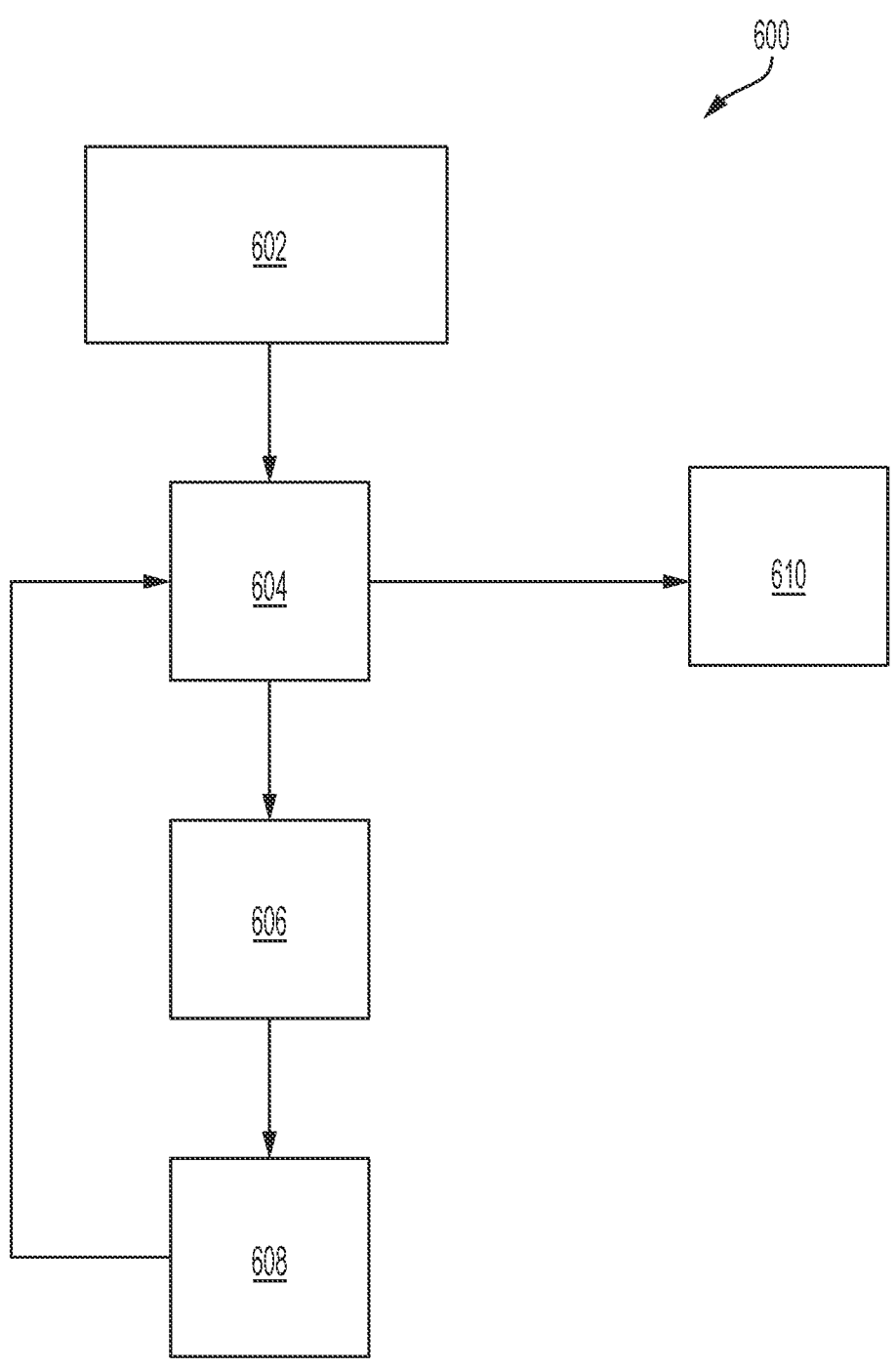
FIG. 7 is a flow diagram of the procedures for executing the preferred physical task for performing using the machine in a cyclic manner, according to some embodiments disclosed herein.

FIG. 7 illustrates a flow diagram 600 of the procedures for executing the preferred physical task for performing using the machine 150 in a cyclic manner. As shown in FIG. 7, the procedures for executing the preferred physical task for performing using the machine 150 in a cyclic manner include establishing the goal of operation of the machine 602, executing the preferred physical task for achieving the goal of operation of the machine 604, requiring input in case of error detection during the execution of the preferred physical task 606, restarting executing the preferred physical task for achieving the goal of operation of machine after solving the error 608, and evaluation of achievement of the goal of operation of the machine 610.

The robotic system 100 can be configured to require a user input for the goal of operation of the machine 602. Specifically, frequently desired goals for operation of the machine 150 can be stored in the main memory 130, from which the preferred physical task for achieving the goal of operation of the machine 150 can be identified. The robotic system 100 can be configured for executing the preferred physical task for achieving the goal of operation of the machine 604 in response to the user input for the goal of operation of the machine 602. For example, the goal of operation of operation of the machine 150 can be to maintain a temperature of a room at a fixed temperature and the robotic system 100 can be configured to execute the preferred physical task of increasing or decreasing the temperature of a thermostat to maintain the temperature of the room at the fixed temperature.

The robotic system 100 can be configured to require input in case of error detection during the execution of the preferred physical task 606. For example, the robotic system 100 can be configured to detect an error in achieving the goal for operating the machine 150 by receiving data from the sensors described in the sections above. Further, the robotic system 100 can be configured to require input to solve the error by comparing the preferred physical task with the a dictionary 224 (glyph dictionary) stored in the main memory 130 of the robotic system 100 to verify the actionable items in the preferred physical task and update the actionable items of the preferred physical task in case of the error. The robotic system 100 can be configured to update the glyph dictionary 224 and the list of physical tasks (including the preferred physical task) stored in the main memory 130 of the robotic system 100 after resolving the error. Further, the robotic system 100 can also be configured to require user-input in response to detecting an error during the execution of the preferred physical task. The robotic system 100 can then be configured to restart executing the preferred physical task for achieving the goal of operation of machine 150 after solving the error 608.

The robotic system 100 can be used to evaluate the achievement of the goal of operation of machine 150 by the execution of the preferred physical task. The evaluation of the achievement of the preferred physical task for achieving the goal of operation of the machine 610 can be performed by evaluating data from the sensors. For example, in the instance of maintaining the temperature of a fixed temperature the robotic system 100 can be configured to use data from a thermal sensor to detect a temperature of the room. Further, the evaluation of the achievement of the preferred physical task for achieving the goal of operation of the machine 610 can further include requiring user-input for confirmation of achievement of the goal of operation of the machine 610. The evaluation of the achievement of the preferred physical task for achieving the goal of operation of the machine 610 can also further include an idle function to stop the robotic system 100 from executing the preferred physical task for achieving the goal of operation of the machine 604 once the goal of operation of the machine 150 has already been achieved.

Figure 8:
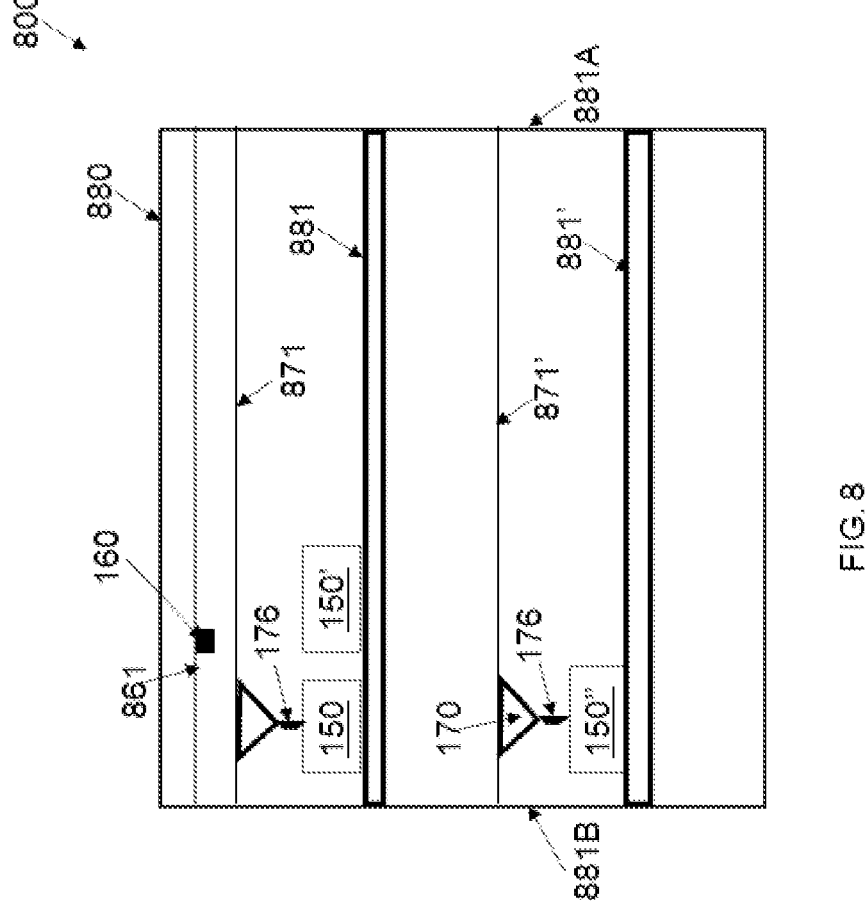
FIG. 8 is a block diagram of an example of a robotic system according to some embodiment disclosed herein.

The robotic system 100 can further be used to operate one or more machines in a serial or parallel order. FIG. 8 depicts a block diagram of an example of the use of the robotic system for operating one or more machines 150, 150'. As shown, the one or more machines 150/150' can be arranged on a shelving unit 880 or a similar structure available in the art that can accommodate one or more machines. The shelving unit can include one or more shelves 881, 881' or similar structure to receive the one or more machines 150, 150'. The machines can be arranged on the shelving unit/the shelves in any suitable manner. For example, in the machines can be arranged on the shelves 881, 881' such that their respective interactive medium is readily available for access by the arm 170 of the robotic system. As shown in FIG. 8, the robotic system 800 can include one or more arms 170, 170', each configured to operate as detailed above. The robotic arm 170 can be connected to the system using a rail-shaped frame 871 that allows the robotic arm to move along the rail-shaped frame 871 (e.g., along direction D 1). The rail-shaped frame 871 can be arranged such that it extends along the length of a shelf 881 and allows the robotic arm 170 to move along the rail 871, over the shelf 881, and interact with the interactive medium(s) of the machine(s). For example, the robotic arm 170 can be configured to move along horizontal (X) and/or vertical (Y) directions about the frame 871. Alternatively or additionally, the robotic arm 170 can be configured to move about the frame 871 in two or more dimensions. For example, the robotic arm 170 can be configured to rotate in multiple directions while also moving horizontally and/or vertically along the rail 871. As noted above, this arrangement of the robotic arm 170 can allow the robotic arm 170 to move in three, four, five, or more dimensions about the frame 871.

In the non-limiting embodiment illustrated in FIG. 8, the robotic arm is configured to move in multiples dimensions (e.g., X, Y, and Z dimensions) along the rail 871 to interface with each of one or more machines 150/150'. As shown, the rail can be rail that extends along the shelving unit 880 from one side 881A of the shelving unit 880 to another side 881B and provides a medium for the robotic arm to move from the first side 881A to the second side 881B. The visual source 160 can further be arranged along another rail 861 (or similar structure) and configured to move in a similar manner as the robotic arm 170 to capture images of the field of view.

As detailed above, an actuator 176 (e.g., a plotter or stylus) of the robotic arm 170 can be configured to interface with the interactive medium 152 of each of the one or more machines 150/150'. As noted above, the actuator can be move along the rail 871 and operate on the machines on a serial and/or parallel order. For example, the actuator can move along the rail 871 from one side 881A to another side 881B and start each machines on a certain task. The actuator can follow up by returning to a first side 881A to continue operating on the machines to follow by performing another task and/or continuing the task previously started on each machine. For example, assuming that the robotic arm is operating on a number of tablets arranged on a shelf, the robotic arm can begin by turning on each tablet starting at the first side 881A, work on starting other tablets as previous tablets start up by moving tablet by tablet along the rail to the second side 881B, return to the first side 881A perform a subsequent task on each tablet (e.g., start an update to the operating system on a device and continue updating other devices as a previous device updates while moving along to the second side 881B), and return to the first side 881A to continue and/or perform other tasks.

As noted above, the visual source 160 can be a static camera or a video camera that provides a live video stream of the interactive medium 152 of each of the one or more machines 150/150' within the field of view 801. The visual source 160 can further be configured move in multiple dimensions (e.g., X, Y, and Z dimensions) to capture an image or live video of each of the one or more machines 150/150'. For example, the visual source 160 can be configured to translate along a camera rail 861 in one or more directions and rotate along the camera rail 861 in one or more dimensions. The robotic arm 170 can translate/rotate along the rail 871 independently of the visual source 860. Alternatively and/or additionally, the robotic arm 170 and the visual source 160 can be arranged to with relationship to each other (e.g., along the same or similar path).

Figure 9:
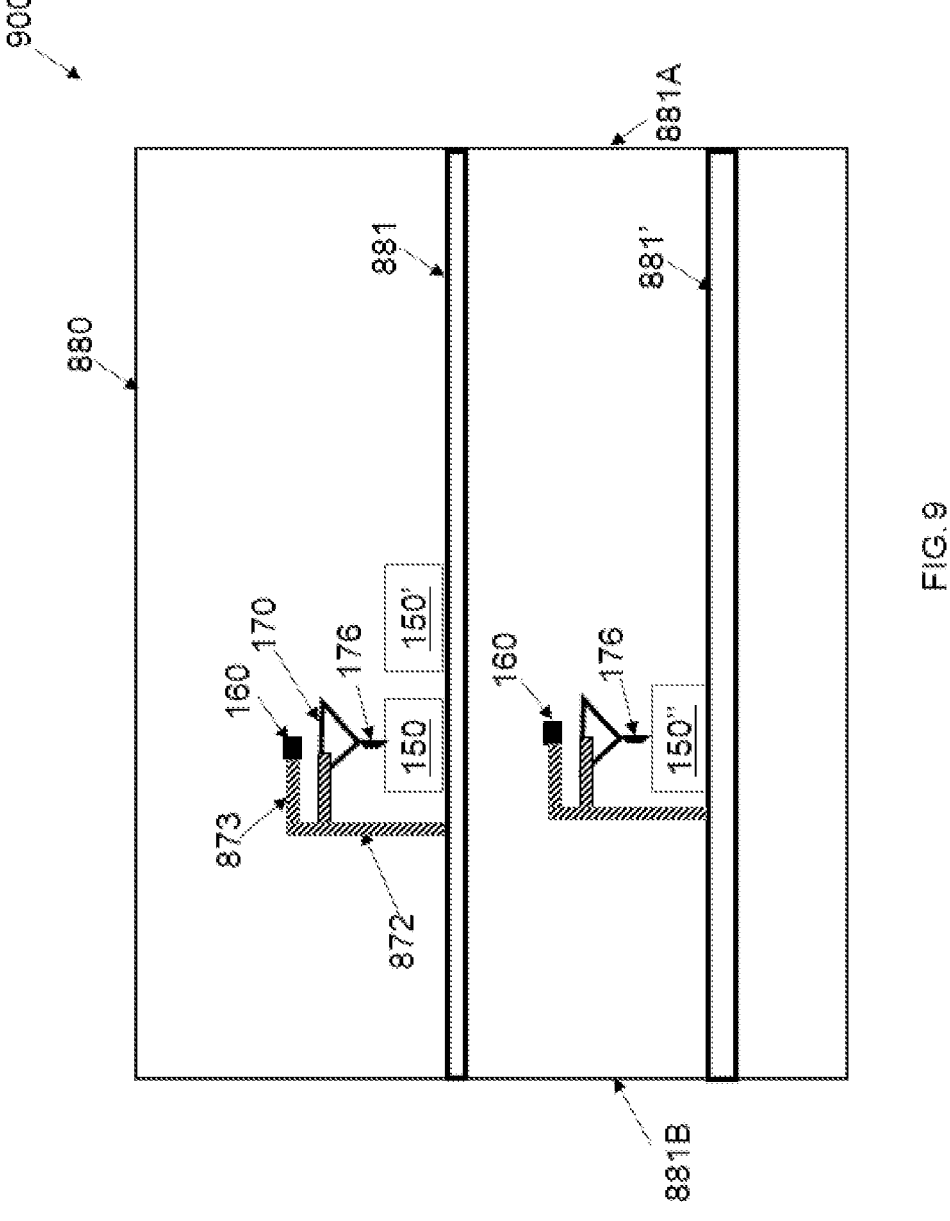
FIG. 9 is a block diagram of an example of robotic system according to one embodiment disclosed herein.

FIG. 9 depicts a block diagram of an example of a robotic system 900 according to some aspects disclosed herein. As shown, the robotic arm 170 can be configured to move about a rail frame 872 in two or more directions (e.g., along direction P1). The frame further includes an extension 873 configured to support the visual source 160. This configuration allows the visual source 160 to move in tandem with the robotic arm 170 at least along one direction.

As noted above, the visual source 160 can captures at least one image or live video of the one or more machines 150/150' within the field of view 801. The at least one image or live video can be provided to the processor 120 (FIG. 1A) for processing the at least one images or live video (e.g., icons of a smart phone or tablet) of the interactive medium 152 of each of the one or more machines 150/150' to extract relevant information about each of the one or more machines 150/150'.

Further, as detailed above, the visual source 160 and the robotic arm 170 can be coupled to the processor 120 via the communications network 148 of FIG. 1A. Upon processing the at least one image or live video, the processor 120 can be configured to control the robotic arm 170 to interface with the interactive medium 152 of each machine 150. For example, the processor 120 can be configured to translate the robotic arm 170 along the rail 871 to interface with different locations of the interactive medium 152 of each of the one or more machines 150/150'.

Figure 10:
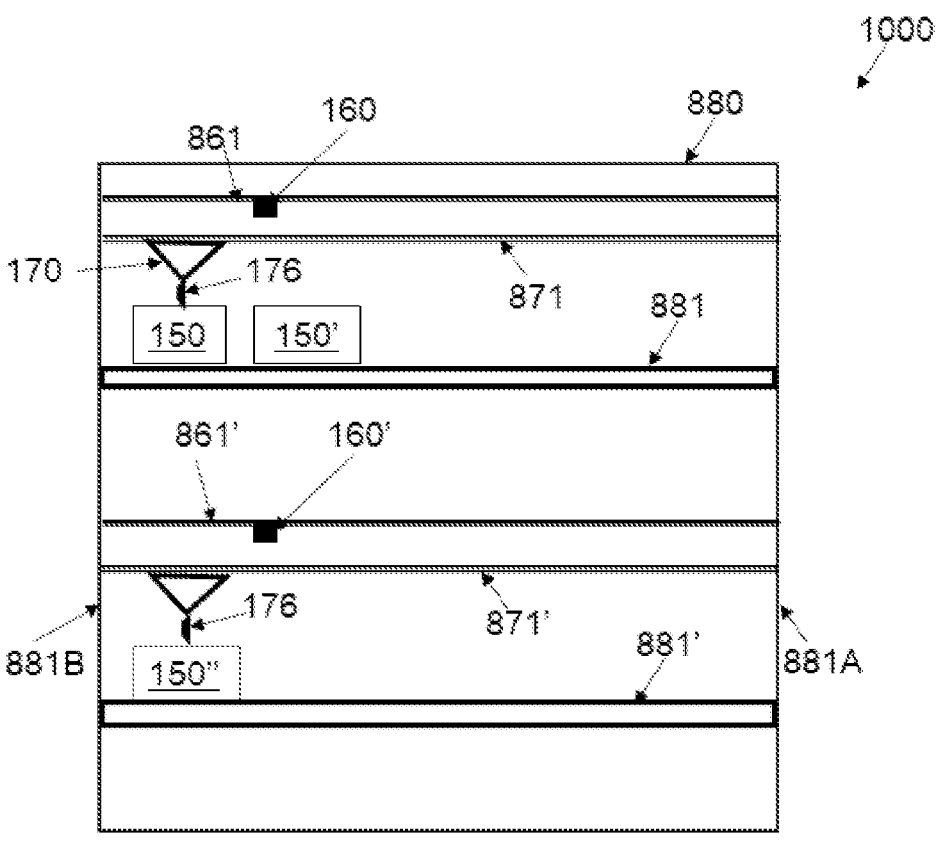
FIG. 10 is a block diagram of an example of robotic system, according to one embodiment disclosed herein.

FIG. 10 depicts another example of a robotic system 1000 according to some aspects disclosed herein. As shown, the system 1000 can include a plurality of visual sources 160/160' that are disposed along a camera rail 861 for capturing at least one image of each of the one or more machines 150/150' within a field of view 801. For example, each of the one or more machines 150/150' can have at least one of the plurality of the visual sources 160/160' allocated for capturing at least one image of that machine 150. The plurality of visual sources 160 can be a static camera or a video camera that provides a live video stream of the interactive medium 152 of each of the one or machines 150/150'. Further, the plurality of visual sources 160/160' can be configured to rotate about their position on the camera rail 861 to obtain additional images of the machine(s) in the field of view.

Further, each of the plurality of the visual sources 160/160' can capture at least one image or live video of each of the one or more machines 150/150' within the field of view

801. As detailed above, the live video can be provided to the processor 120 of FIG. 1A for processing the at least one images or live video (e.g., icons of a smart phone or tablet) of the interactive medium 152 of each of the one or more machines 150/150' to extract relevant information about each of the one or more machines 150/150'.

Figure 11:
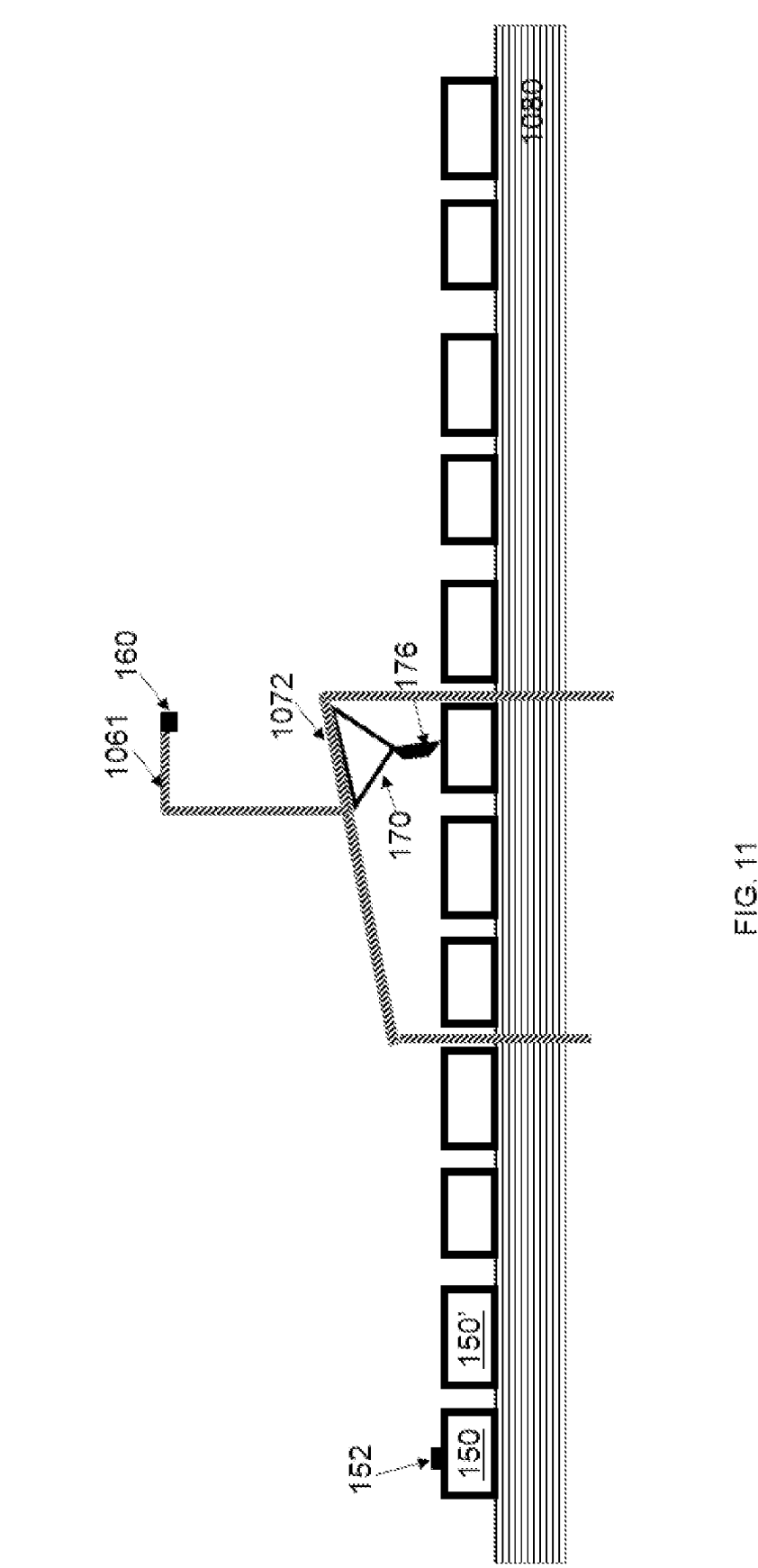
FIG. 11 is a block diagram of an example of robotic system, according to one embodiment disclosed herein.

FIG. 11 depicts another example of a robotic system 1100, which can be used to operate the one or more machines 150/150'. As shown in FIG. 11, the one or more machines 150/150' can be arranged on a moving belt 1080 (e.g., a conveyer belt) to move along a direction Dl. A frame 1072 of the robotic arm can be disposed on the moving belt 1080 such that the robotic arm 170 can interface with the interactive medium 152 of each machine as the machine moves along the moving belt. For example, the robotic arm 170 can be disposed on a fixed location on the belt 1080 such that it can interface with the interactive medium 152 of each machine as a machine moves on the belt and comes near the robotic arm 170. The frame 1072 further includes an extension 1061 configured to support a visual source 160.

As noted above, the actuator 176 can be configured to translate/move and/or rotate about at least one additional direction(s) and/or dimension(s) with respect to the robotic arm 170 disposed on the rail 1071. The actuator 176 can be configured to rotate about its coupling to the distal end 175 of the robotic arm 170, thereby providing at least one additional direction of movement/rotation with respect to the robotic arm 170. The projection 174 of the actuator 176 can also be configured to move/rotate about its coupling to actuator 176, thereby providing a further additional direction of movement/rotation with respect to the robotic arm 170.

Those having ordinary skill in the art will appreciate that various changes can be made to the above embodiments without departing from the scope of the invention. Although this specification discloses advantages in the context of certain illustrative, non-limiting embodiments, various changes, substitutions, permutations, and alterations may be made without departing from the scope of the specification as defined by the appended claims. Further, any feature described in connection with any one embodiment may also be applicable to any other embodiment.

The invention claimed is:

1. A robotic system for operating a machine, the machine comprising an interface having an interactive medium for use in performing a physical task using the machine, the robotic system comprising:

a robotic arm comprising a proximal end and a distal end;

an actuator coupled to the robotic arm at the distal end, the actuator being configured to physically interact with the interactive medium;

a visual source configured to provide an image of the machine in a field of view;

a processor coupled to the robotic arm and the visual source; and a memory coupled to the processor and configured to store computer executable programs comprising instructions that upon execution by the processor:

extract, from the image, information indicating a metric for identifying the interface within the field of view, wherein the metric comprises at least one of a location, an orientation, a dimension, and a boundary of the interface in the field of view;

identify the interface within the field of view using the information extracted from the image;

operate the robotic arm to interact with the identified interface via the actuator and receive, from the robotic arm, a signal indicating detection of a change in the interactive medium by the actuator;

extract information indicating a characteristic of the interactive medium based on the signal from the actuator indicating the detection of the change in the interactive medium, wherein the characteristic of the interactive medium includes position of at least one element of the interactive medium; and operate the robotic arm to actuate the at least one element of the interactive medium to perform the physical task using the machine.

2. The robotic system of claim 1, wherein the instructions, upon execution, analyze the information indicating the metric for identifying the interface within the field of view to determine if additional information for identifying the interface is required and in an event the additional information is required, obtain at least one additional image from the visual source.

3. The robotic system of claim 2, wherein the visual source comprises a camera configured to rotate around the machine in the field of view to obtain the image of the machine in a field of view.

4. The robotic system of claim 3, wherein the system is configured to adjust the visual source to obtain the at least one additional image.

5. The robotic system of claim 1, wherein the actuator comprises a pressure sensor disposed at a distal tip of the actuator that generates the signal indicating detection of the change in the interactive medium by the actuator upon sensing at least one of a resistance change or a displacement in the interactive medium.

6. The robotic system of claim 1, wherein the visual source is configured to provide a plurality of images and wherein the instructions, upon execution, analyze each image provided by the visual source and score each image based on at least one of an amount of the information indicating the metric for identifying the interface within the field of view or a probability of accurate identification of the interface within the field of view and exclude images having a score less than a predetermined score from being used for identifying the interface within the field of view.

7. The robotic system of claim 6, wherein the instructions, upon execution, score the plurality of images based on previously validated data.

8. The robotic system of claim 7, wherein the previously validated data comprises at least one of: data obtained from a glyph dictionary, data provided by a human operator of the machine, data about the machine obtained from a remote entity via a communications network, data obtained from an original manual of the machine, and data obtained from an online resource for the machine.

9. The robotic system of claim 8, wherein the glyph dictionary comprises a collection of images of common interactive medium elements.

10. The robotic system of claim 8, wherein the instructions, upon execution, update the glyph dictionary to include the metric for identifying the interface within the field of view obtained from the information extracted from at least one image.

11. The robotic system of claim 1, wherein the memory is configured to store a list of physical tasks for performing using interactive medium of the machine.

12. The robotic system of claim 11, wherein the robotic system is configured to obtain the list of physical tasks from at least one of a human operator, an original manual of the machine, and an online resource for the machine.

13. The robotic system of claim 12, wherein the memory is configured to store a ranking for each physical task in the list of physical tasks and wherein the instruction, open execution, operate the robotic arm to perform a physical task having a higher ranking before a physical task having a lower ranking.

14. The robotic system of claim 1, wherein the instructions, upon execution, extract, from the image, the information indicating the metric for identifying the interface within the field of view using an image processing scheme that employs a deep learning framework to identify the interface.

15. The robotic system of claim 14, wherein the deep learning framework comprises at least one of supervised deep learning, unsupervised deep learning, or reinforced deep learning.

16. The robotic system of claim 1, further comprising an optical sensor configured to measure a light intensity within the field of view.

17. The robotic system of claim 16, wherein the instructions, upon execution, extract use the light intensity measured by the optical sensor to extract the metric for identifying the interface within the field of view.

18. The robotic system of claim 16, wherein the visual source comprises a camera configured to obtain the image of the machine in a field of view and wherein the system is configured to adjust the light intensity prior to obtaining the image.

19. The robotic system of claim 1, wherein the visual source is coupled to the robotic system via a communications network.

20. The system of claim 1, wherein the processor is configured to execute the instructions in response to a voice command.

21. The system of claim 1, further comprising a user interface coupled to the processor, the user interface being configured for use to control the robotic system.

* * * * *